(12) United States Patent
Kim et al.

(10) Patent No.: US 10,561,291 B2
(45) Date of Patent: Feb. 18, 2020

(54) CLEANER HOLDER

(71) Applicant: LG ELECTRONICS INC., Seoul (KR)

(72) Inventors: Namhee Kim, Seoul (KR); Bohyun Nam, Seoul (KR); Jungbae Hwang, Seoul (KR); Jinju Kim, Seoul (KR); Sehwan Bae, Seoul (KR)

(73) Assignee: LG Electronics Inc., Seoul (KR)

(*) Notice: Subject to any disclaimer, the term of this patent is extended or adjusted under 35 U.S.C. 154(b) by 224 days.

(21) Appl. No.: 15/590,276

(22) Filed: May 9, 2017

(65) Prior Publication Data

US 2017/0319038 A1 Nov. 9, 2017

(30) Foreign Application Priority Data

May 9, 2016 (KR) .......................... 10-2016-0056462
Dec. 15, 2016 (KR) .......................... 10-2016-0171723

(51) Int. Cl.
| | | |
|---|---|---|
| *A47L 7/00* | (2006.01) | |
| *A47L 9/28* | (2006.01) | |
| *A47L 5/28* | (2006.01) | |
| *H01M 10/44* | (2006.01) | |
| *A47L 5/00* | (2006.01) | |
| *A47L 9/00* | (2006.01) | |

(52) U.S. Cl.
CPC .................................... *A47L 9/28* (2013.01);
*A47L 5/28* (2013.01); *A47L 9/2884* (2013.01);
*H01M 10/44* (2013.01); *A47L 5/00* (2013.01);
*A47L 9/00* (2013.01)

(58) Field of Classification Search
USPC .................................... 15/320, 329, 344, 352
See application file for complete search history.

(56) References Cited

U.S. PATENT DOCUMENTS

| | | | |
|---|---|---|---|
| 5,926,909 A | 7/1999 | McGee | |
| 9,155,431 B2 | 10/2015 | Dyson et al. | |
| 10,080,471 B2* | 9/2018 | Reimer | .................... A47L 5/225 |
| 2002/0148070 A1* | 10/2002 | Tsuchiya | .................... A47L 5/28 |
| | | | 15/352 |

(Continued)

FOREIGN PATENT DOCUMENTS

| | | |
|---|---|---|
| CN | 105395132 | 3/2016 |
| GB | 2441962 | 3/2008 |

(Continued)

OTHER PUBLICATIONS

International Search Report in International Application No. PCT/KR2017/004735, dated Aug. 9, 2017, 3 pages (with partial English translation).

(Continued)

*Primary Examiner* — Joseph J Hail
*Assistant Examiner* — Shantese L McDonald
(74) *Attorney, Agent, or Firm* — Fish & Richardson P.C.

(57) ABSTRACT

A cleaner holder includes a charging stand body that includes a charging terminal configured to charge a battery of a cleaner, a base configured to rest on a floor, a support that connects the charging stand body to the base, and a wall surface fixing part that is configured to be interposed between a rear surface of the charging stand body and a wall surface and to fix the charging stand body to the wall surface.

19 Claims, 30 Drawing Sheets

(56) References Cited

U.S. PATENT DOCUMENTS

| | | | | |
|---|---|---|---|---|
| 2008/0040883 | A1* | 2/2008 | Beskow | A47L 5/225 15/329 |
| 2010/0090184 | A1* | 4/2010 | Manning | E01F 13/026 256/1 |
| 2011/0219571 | A1* | 9/2011 | Dyson | A47L 5/24 15/344 |
| 2013/0328523 | A1 | 12/2013 | Ota et al. | |
| 2015/0135470 | A1 | 5/2015 | Mantyla et al. | |
| 2016/0051109 | A1* | 2/2016 | Hwang | A47L 5/225 15/339 |
| 2016/0174787 | A1 | 6/2016 | Conrad | |
| 2017/0319034 | A1 | 11/2017 | Kim et al. | |
| 2017/0319035 | A1 | 11/2017 | Kim et al. | |
| 2017/0319036 | A1 | 11/2017 | Kim et al. | |
| 2017/0319037 | A1 | 11/2017 | Kim et al. | |
| 2017/0319039 | A1 | 11/2017 | Kim et al. | |
| 2018/0125314 | A1 | 5/2018 | Kim et al. | |

FOREIGN PATENT DOCUMENTS

| | | | |
|---|---|---|---|
| JP | S4965558 | | 6/1974 |
| JP | S53157568 | | 12/1978 |
| JP | S55174850 | | 12/1980 |
| JP | S61164894 | | 10/1986 |
| JP | S62290428 | | 12/1987 |
| JP | 63143260 | | 9/1988 |
| JP | H01209929 | | 8/1989 |
| JP | 3015517 | | 9/1995 |
| JP | H11205427 | | 7/1999 |
| JP | 2001095168 | | 4/2001 |
| JP | 2001149289 | | 6/2001 |
| JP | 2004121469 | | 4/2004 |
| JP | 2004241342 | | 8/2004 |
| JP | 2011189132 | | 9/2011 |
| JP | 2014200379 | * | 4/2013 ............... A47L 7/00 |
| JP | 2014124443 | | 7/2014 |
| JP | 2014200379 | | 10/2014 |
| JP | 2015012946 | | 1/2015 |
| JP | 2015119879 | | 7/2015 |
| JP | 2015134131 | | 7/2015 |
| KR | 20-1998-0018401 | | 7/1998 |
| KR | 200194997 | | 9/2000 |
| KR | 200246448 | | 8/2001 |
| KR | 10-2003-0041568 | | 5/2003 |
| KR | 100614320 | | 8/2006 |
| KR | 10-2012-0103956 | | 9/2012 |
| KR | 10-2012-0103964 | | 9/2012 |
| KR | 10-2016-0023134 | | 3/2016 |
| WO | 2015129387 | | 9/2015 |
| WO | 2016114038 | | 7/2016 |
| WO | 2017101542 | | 6/2017 |

OTHER PUBLICATIONS

International Search Report in International Application No. PCT/KR2017/004740, dated Jul. 27, 2017, 3 pages (with partial English translation).

International Search Report in International Application No. PCT/KR2017/004392, dated Aug. 7, 2017, 3 pages (with partial English translation).

International Search Report in International Application No. PCT/KR2017/004391, dated Jul. 28, 2017, 3 pages (with partial English translation).

International Search Report in International Application No. PCT/KR2017/004278, dated Jun. 29, 2017, 3 pages (with partial English translation).

International Search Report in International Application No. PCT/KR2017/004276, dated Jun. 29, 2017, 3 pages (with partial English translation).

International Search Report in International Application No. PCT/KR2017/004741, dated Jul. 28, 2017, 3 pages (with partial English translation).

* cited by examiner

CLEANER HOLDER

CROSS-REFERENCE TO RELATED APPLICATIONS

This application claims priority under 35 U.S.C. § 119 to Korean Patent Application No. 10-2016-0056462, filed in Korea on May 9, 2016, and Korean Patent Application No. 10-2016-0171723, filed in Korea on Dec. 15, 2016, whose entire disclosure is hereby incorporated by reference.

BACKGROUND

The present disclosure relates to a cleaner holder.

A cleaner is a device that performs cleaning by sucking and wiping dust or foreign substances on a surface to be cleaned.

Such a cleaner may be classified into a manual cleaner that performs cleaning while a user directly moves the cleaner and an automatic cleaner that performs cleaning while the cleaner is driven by itself. The manual cleaner may be classified into a canister cleaner, an upright cleaner, a handheld cleaner, a stick cleaner and the like depending on types of the cleaner.

The above-described cleaner may have a rechargeable battery embedded therein, and the rechargeable battery may supply electric power for operating the cleaner only when being frequently charged. Thus, the cleaner requires a holder that may simultaneously charge the rechargeable battery and hold the cleaner.

Contents of a vacuum cleaner holder are disclosed in Korean Patent Application Publication No. 10-2012-0103956 as the prior art.

The vacuum cleaner holder according to the prior art includes a pedestal for holding a head of a vacuum cleaner to simultaneously charge and hold the vacuum cleaner and a support having charging pins for charging the vacuum cleaner.

Meanwhile, the vacuum cleaner holder according to the prior art, which holds a vacuum cleaner having a center on a lower side thereof, is inserted into support pieces on a lower side of the vacuum cleaner to support the vacuum cleaner. However, in case of a cleaner having a center on an upper side thereof, because a charging terminal should be provided on an upper side, the cleaner holder according to the prior art may not hold the cleaner.

Meanwhile, there is a problem in that when an upper portion-centered vacuum cleaner is held on a cleaner holder, the vacuum cleaner is easily turned over by external force. However, it is difficult that the cleaner holder according to the prior document may stably hold the upper portion-centered vacuum cleaner.

SUMMARY

The present disclosure provides a cleaner holder that may charge and stably hold a cleaner.

The present disclosure provides a cleaner holder that is prevented from being turned over by predetermined external force.

A cleaner holder includes: a charging stand body having a charging terminal configured to charge a battery of a cleaner; a support connected to the charging stand body; a base supported on a floor and connected to the support; and a wall surface fixing part configured to fix the charging stand body to a wall surface while being interposed between the wall surface and the charging stand body.

BRIEF DESCRIPTION OF THE DRAWINGS

Embodiments will be described in detail with reference to the following drawings in which like reference numerals refer to like elements, and wherein.

DETAILED DESCRIPTION OF THE EMBODIMENTS

Figure 1:
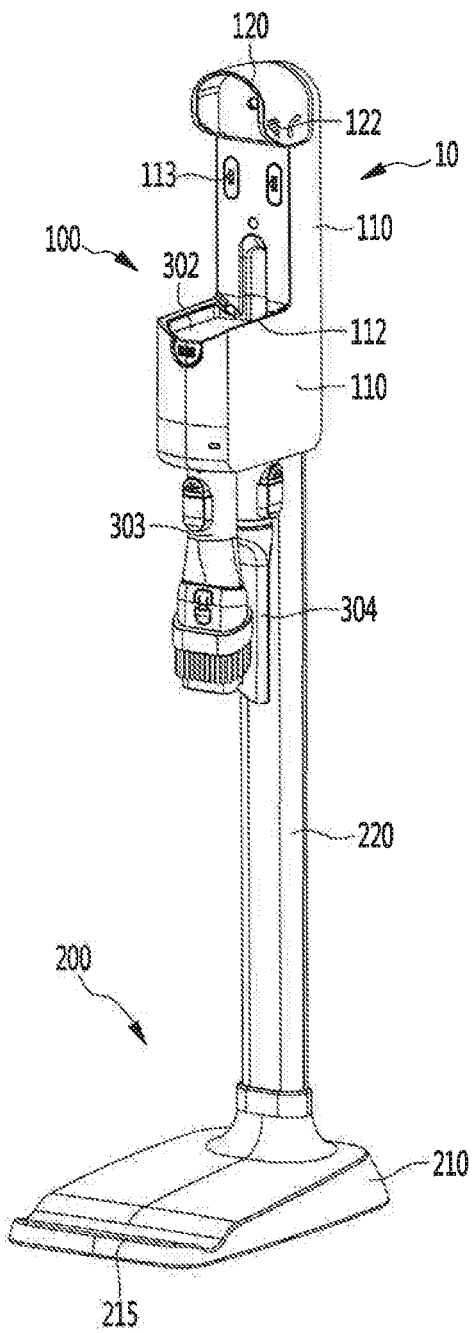
FIG. 1 is a perspective view illustrating a cleaner holder according to a first embodiment of the present disclosure.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
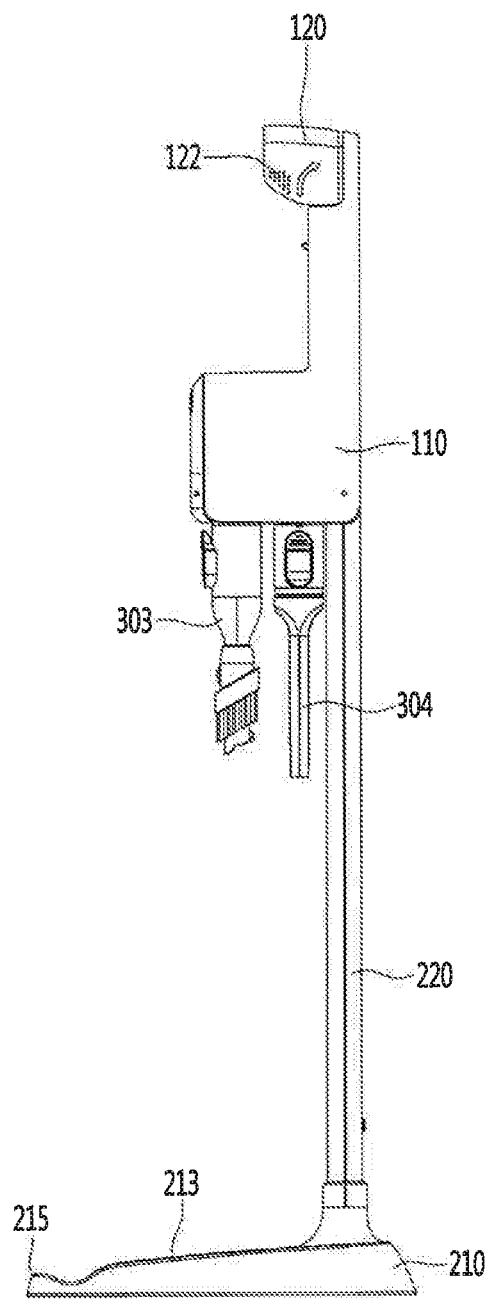
FIG. 2 is a side view of the cleaner holder of FIG. 1.
Figure 3:
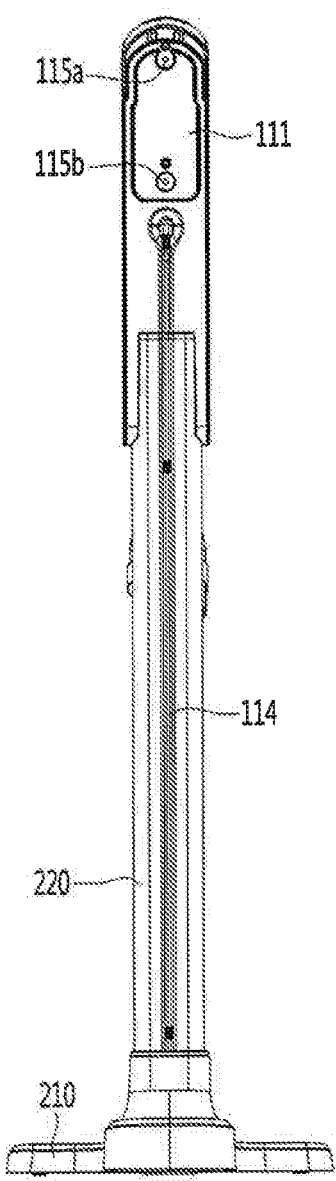
FIG. 3 is a rear view of the cleaner holder of FIG. 1.
Figure 4:
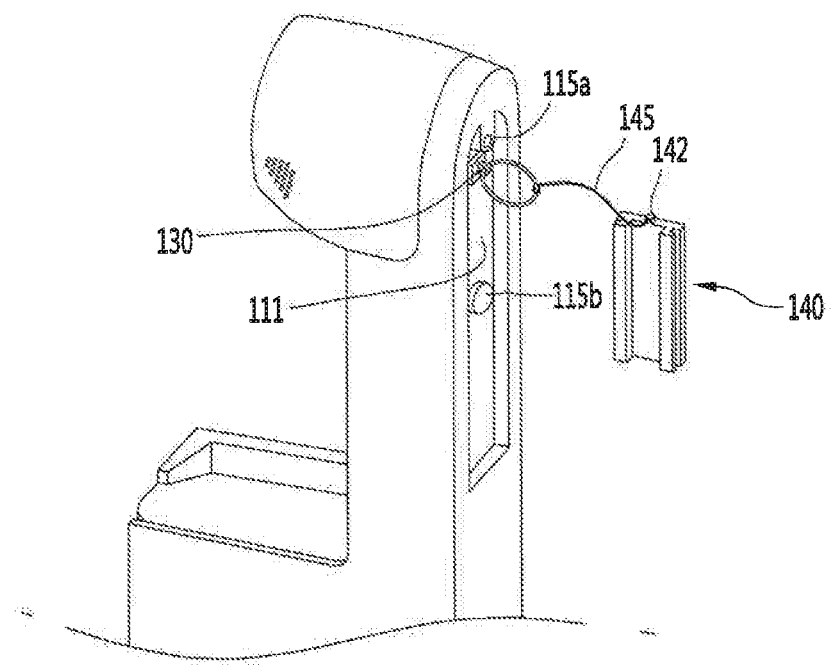
FIG. 4 is a view illustrating a state in which a strap is connected to a charging stand body of FIG. 1.
Figure 5:
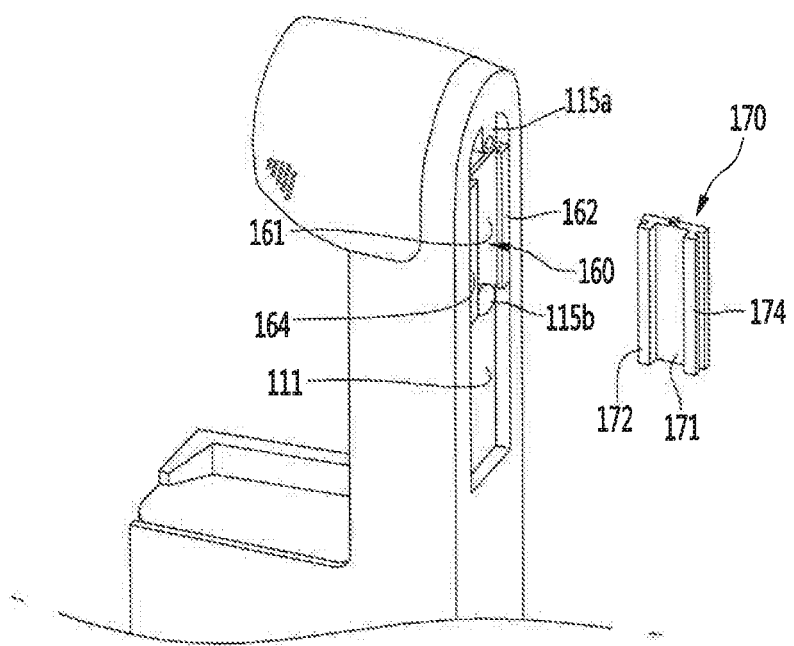
FIG. 5 is a view illustrating a state in which a fixing member is provided on a rear surface of the charging stand body of FIG. 1.
Figure 6:
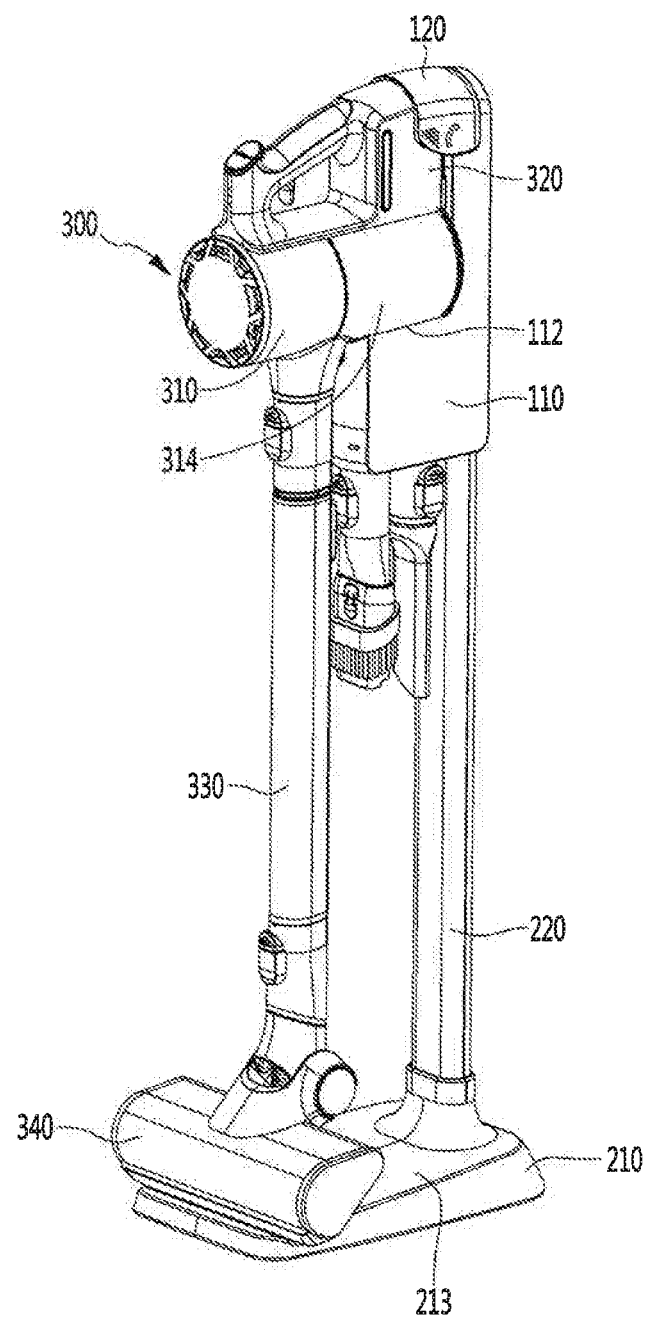
FIG. 6 is a view illustrating a state in which a cleaner is held on the cleaner holder.

FIG. 1 is a perspective view illustrating a cleaner holder according to a first embodiment of the present disclosure, FIG. 2 is a side view illustrating the cleaner holder of FIG. 1, FIG. 3 is a rear view illustrating the cleaner holder of FIG. 1, FIG. 4 is a view illustrating a state in which a strap is connected to a rear surface of a charging stand body of FIG. 1, FIG. 5 is a view illustrating a state in which a fixing member is provided on a rear surface of the charging stand body, and FIG. 6 is a view illustrating a state in which a cleaner is held on the cleaner holder.

Referring to FIGS. 1 and 6, a cleaner holder 10 according to the embodiment of the present disclosure includes a charging stand 100 for charging a battery of the cleaner 300. The charging stand 100 may simultaneously support the cleaner 300 and charge the battery provided in the cleaner 300.

The cleaner 300 may include a cleaner body 310 having a suction motor, a battery housing 320 in which the battery is accommodated, an extension tube 330 and a suction nozzle 340. External air may be introduced by suction force generated in the cleaner body 310 through the suction nozzle 340 and the extension tube 330 and may be moved to the dust container 314 provided in the cleaner body 310. Hereinafter, detailed descriptions of the cleaner 300 will be omitted.

The charging stand 100 includes a charging stand body 110.

The charging stand body 110 includes a charging port 113. The charging port 113 may be in contact with terminals of the cleaner 300 to charge the battery provided in the cleaner 300.

An extra battery 302 may be accommodated in the charging stand body 110. Although not illustrated, the charging stand body 110 may additionally include a charging port for charging the extra battery 302.

Extra nozzles 303 and 304 may be coupled to the charging stand body 110. The nozzles 303 and 304 may be attached/detached to/from the cleaner 300 or the like. In general, a cleaner may include a plurality of replaceable suction nozzles according to usage. Thus, it is inconvenient to store the suction nozzle that is not used. However, in this way, when the suction nozzles 303 and 304 are stored while being coupled to the charging stand body 110, the risk of loss is reduced, and a user may easily use the same. The extra nozzles 303 and 304 may be named accessories.

Fixing parts 115a and 115b for fixing the charging stand 100 to a wall surface may be provided on a rear surface 111 of the charging stand body 110. Accordingly, the charging stand 110 may be fixed to the wall surface. For example, the fixing parts 115a and 115b may have a hole or groove shape. Accordingly, nails or the like, which are installed on the wall surface, are inserted into the fixing parts 115a and 115b, so that the charging stand body 110 may be fixed to the wall surface.

A support part 112 for supporting the cleaner body 310 may be provided in the charging stand body 110. The support part 112 may protrude forward. The support part 112 may support the cleaner body 310 from below.

The charging stand 100 may further include a locking part 120 provided in the charging stand body 110. The locking part 120 may be coupled to the cleaner 300 to stably fix the cleaner 300.

In detail, the locking part 120 may be coupled to the battery housing 320 to support the cleaner 300. An inner peripheral surface of the locking part 120 may have a shape corresponding to an outer peripheral surface of the battery housing 320 to surround the outer peripheral surface of the battery housing 320.

The user may selectively rotate the locking part 120 forward/rearward such that the locking part 120 may be coupled to the battery housing 320. The locking part 120 may include an anti-slide part 122 for providing friction force such that the user may easily grip the locking part 120. The anti-slide part 122 may include a plurality of bosses on an outer peripheral surface of the locking part 120.

The cleaner holder 10 may further include a stand 200 for supporting the charging stand 100.

The stand 200 may include a base 210 supported on a floor and a support 220 provided in the base 210. The support 220 may be detachably coupled to the charging stand 100.

The support 220 may extend from the base 210 in a vertical direction. The support 220 may be coupled to an electric wire 114 provided in the charging stand 100. The electric wire 114 may extend from the rear surface 111 of the charging stand body 110 to be connected to an external power source.

The base 210 may include an inclined surface 213 on which the suction nozzle 340 of the cleaner 300 is held and a stopper 215 for preventing the suction nozzle 340 of the cleaner 300 from being separated therefrom.

The stopper 215 may protrude from an end of the inclined surface 213. The stopper 215 serves to support the suction nozzle 340 such that a state in which the suction nozzle 340 is stably seated on the base 210 may be maintained.

Meanwhile, a strap 145 configured to prevent the cleaner holder 10 from being turned over may be connected to the charging stand body 110 (see FIG. 4). In detail, one end of the strap 145 is connected to a rear surface 111 of the charging stand body 110 and the other end of the strap 145 may be fixed to the wall surface. Accordingly, even when predetermined force is applied to the cleaner holder 10, the cleaner holder 10 may be prevented from being turned over, by the strap 145.

A connection member 130 connected to one end of the strap 145 may be provided in the charging stand body 110. The connection member 130 may be provided on the rear surface 111 of the charging stand body 110. Further, the connection member 130 may be arranged between the fixing parts 115a and 115b.

The other end of the strap 145 may be connected to a first wall surface fixing part 140 fixed to a wall surface. The first wall surface fixing part 140 may be fixed to the wall surface by a double-sided tape, a screw nail or the like. A connection port 142 to which the other end of the strap 145 is connected may be provided in the first wall fixing part 140.

Meanwhile, the charging stand body 110 may be coupled to a second wall surface fixing part 170 fixed to the wall surface, and may be thus fixed to the wall surface. The second wall surface fixing part 170 may be fixed to the wall surface by a double-sided tape, a screw nail or the like.

A fixing member 160 may be provided in the charging stand body 110 such that the charging stand body 110 is coupled to the second wall surface fixing part 170. The fixing member 160 may be fixed to the rear surface 111 of the charging stand body 110.

The fixing member 160 and the second wall surface fixing part 170 may be coupled to each other in a sliding manner. Accordingly, a user may easily fix the the charging stand body 110 to the wall surface.

The second wall surface fixing part 170 may include a body 171 and insertion bosses 172 and 174 provided in the body 171. The insertion bosses 172 and 174 are to be coupled to the fixing member 160. Fixing ribs 162 and 164 to which the insertion bosses 172 and 174 are coupled may be provided in the fixing member 160. The fixing member 160 and the second wall surface fixing part 170 are provided, so that the cleaner holder 10 may be prevented from being turned over by external force or the like.

Meanwhile, the first wall surface fixing part 140 and the second wall surface fixing part 170 may have substantially the same shape. That is, a connection port to which the strap 145 is fixed may be provided in the second wall fixing part 170. Thus, the user may prevent the charging stand body 110 from being turned over in various schemes depending on usage.

Meanwhile, an overturning angle and an overturning force in the front-rear direction and in the left-right direction of the cleaner holder 20 according to the present embodiment will be described below. Here, the overturning angle means a slope value of a floor when the cleaner holder 20 is turned over and the overturning force means force for turning over the cleaner holder 20.

Hereinafter, a method for coupling the cleaner 300 to the holder 10 will be described.

Figure 7A:
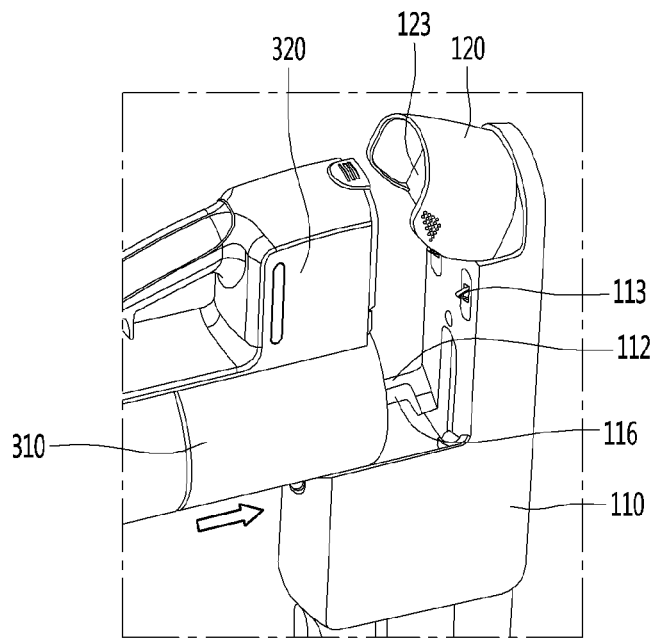
FIG. 7A is a view illustrating a state in which the cleaner is coupled to a support.
Figure 7B:
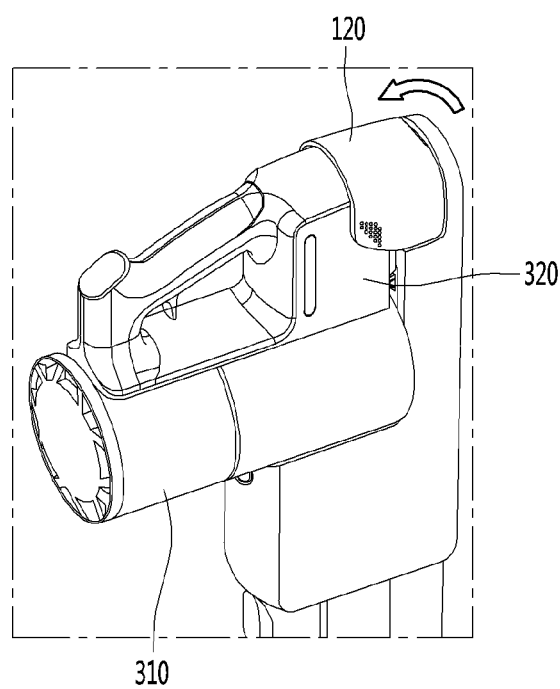
FIG. 7B is a view illustrating a state in which a locking part is coupled to the cleaner.

FIG. 7 is a view illustrating a state in which a cleaner is held on the cleaner holder. In detail, FIG. 7A illustrates a state in which the cleaner is coupled to a support part, and FIG. 7B illustrates a state in which the locking part is coupled to the cleaner.

Referring to FIG. 7, a guide 116 for guiding movement of the cleaner body 310 may be provided in the charging stand body 110.

The guide 116 may be provided inside the support part 112. Accordingly, the cleaner body 310 may be moved forward/rearward along the guide 116 while being supported by the support part 112. As illustrated, the cleaner body 310 is moved along the guide 116 to come into contact with the charging port 113.

The locking part 120 may be rotatably connected to the charging stand body 110 within a predetermined angle. FIG. 5A illustrates a state in which the locking part 120 is maximally rotated rearward (in a clockwise direction in FIG. 5A).

The charging stand body 110 may include an elastic member (not illustrated) for applying elastic force to the locking part 120. In a state in which the locking part 120 is rotated rearward, the elastic member (not illustrated) may apply elastic force to a rear side thereof such that a state in which the locking part 120 is rotated rearward is maintained.

The locking part 120 may include a push part 123. The push part 123 may be provided inside the locking part 120. The push part 123 may be pressed by the battery housing 320 while the cleaner body 310 is moved along the guide 116.

When the push part 123 is pressed by the battery housing 320, the locking part 120 may be operated.

In detail, when the locking part 120 is operated, the locking part 120 may be rotated forward (in a counterclockwise direction in FIG. 7B) to be coupled to the outer peripheral surface of the battery housing 320. Accordingly, the locking part 120 may cover at least a portion of the battery housing 320.

When the locking part 120 is rotated forward, the elastic member (not illustrated) may apply elastic force such that a state in which the locking part 120 is rotated forward is maintained. Accordingly, the locking part 120 may serve to fix the battery housing 320 to the charging stand body 110.

Figure 8:
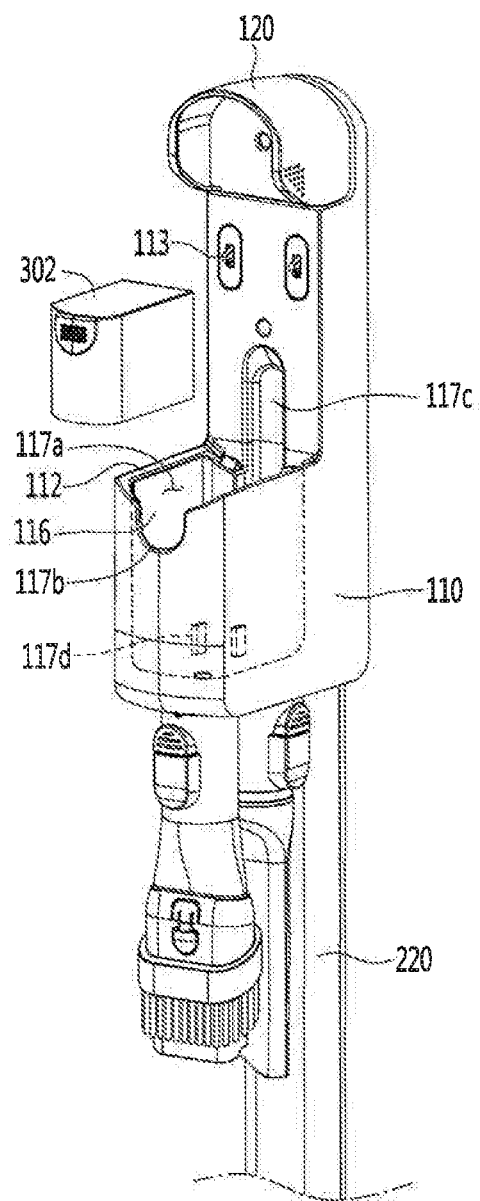
FIG. 8 is a view illustrating a state in which an extra battery is separated from the cleaner holder.

FIG. 8 is a view illustrating a state in which an extra battery is separated from the cleaner holder.

Referring to FIG. 8, the charging stand body 110 may include a battery accommodating part 117a for accommodating the extra battery 302.

The battery accommodating part 117a may be recessed rearward from one surface of the charging stand body 110. Further, the battery accommodating part 117a may be provided inside the support part 112 and the guide 116.

A charging port 117d for charging the extra battery 302 may be provided inside the battery accommodating part 117a.

The charging stand body 110 may include grooves 117b and 117c for allowing the extra battery 302 accommodated in the battery accommodating part 117a to be easily gripped.

The grooves 117b and 117c may include a first groove 117b provided in front of the battery accommodating part 117a and a second groove 117c provided on a rear side of the battery accommodating part 117a.

Figure 9:
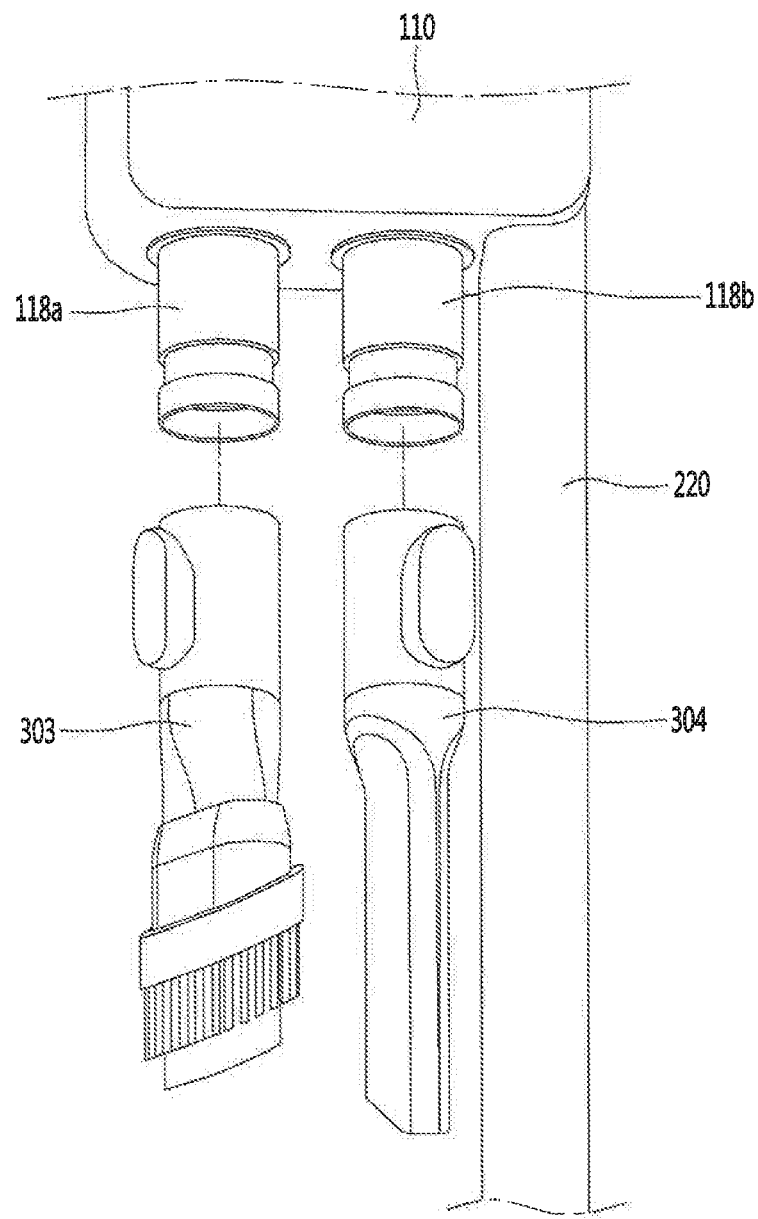
FIG. 9 is a view illustrating a state in which a nozzle is separated from a charging stand.

FIG. 9 is a view illustrating a state in which a nozzle is separated from a charging stand.

Referring to FIG. 9, the charging stand body 110 may include connectors 118a and 118b to which the extra nozzles 303 and 304 are selectively coupled. The connectors 118a and 118b may extend from one side of the charging stand body 110.

The user may attach/detach the nozzles 303 and 304 to the connectors 118a and 118b as needed. Accordingly, because the extra nozzles 303 and 304 are easily stored and used, user convenience may be improved.

Figure 10:
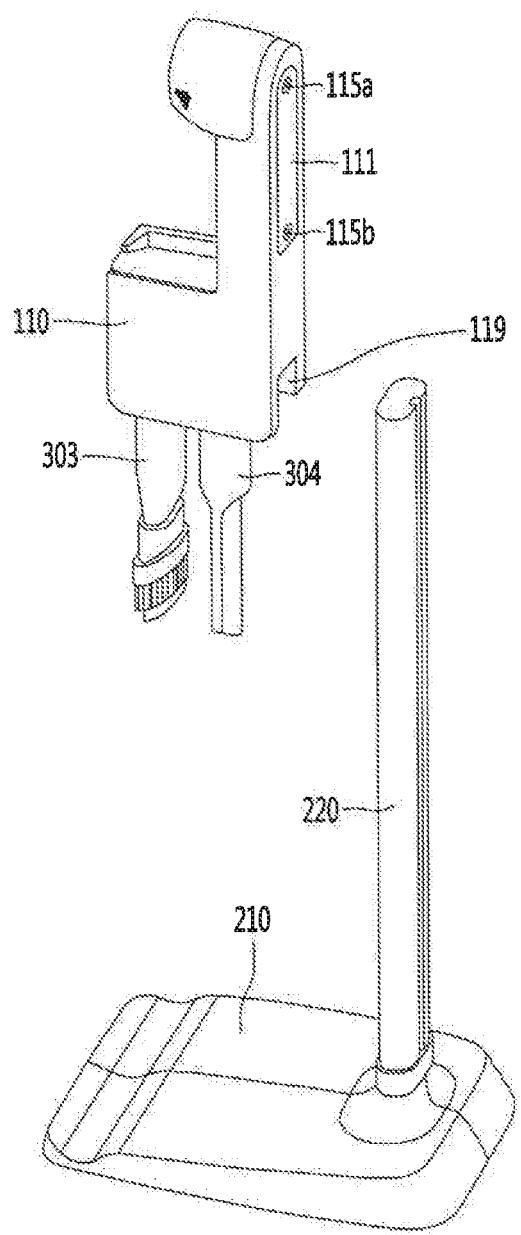
FIG. 10 is a view illustrating a state in which the charging stand is separated from the support.
Figure 11:
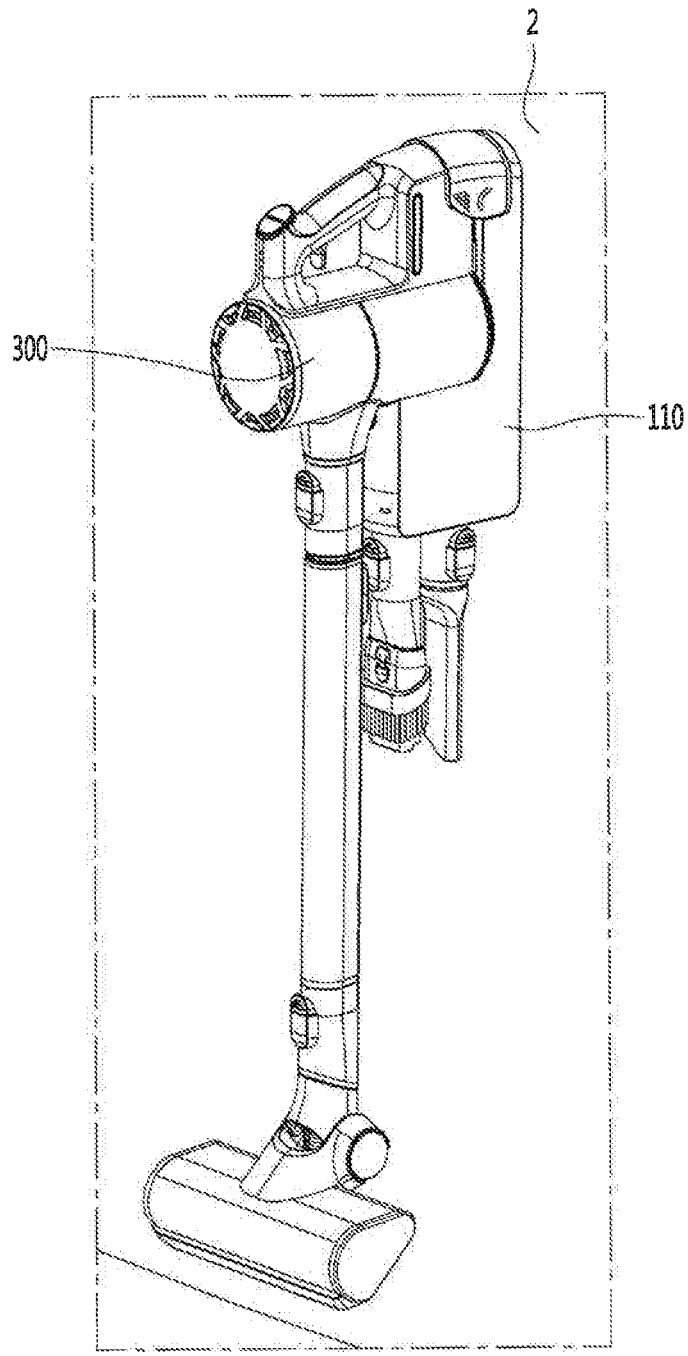
FIG. 11 is a view illustrating a state in which the charging stand on which the cleaner is held is mounted on a wall surface.

FIG. 10 is a view illustrating a state in which the charging stand is separated from the support, and FIG. 11 is a view illustrating a state in which the charging stand on which the cleaner is held is mounted on a wall surface.

Referring to FIGS. 10 and 11, the charging stand body 110 may include a coupling part 119 to which the support 220 is coupled. The support 220 may be detachably coupled to the coupling part 119. Accordingly, the user may easily separate the charging stand body 110 and the support 220 from each other.

As needed, the user may fix the charging stand body 110 from which the support 220 is separated to a wall surface 2 using the fixing parts 115a and 115b.

Figure 12:
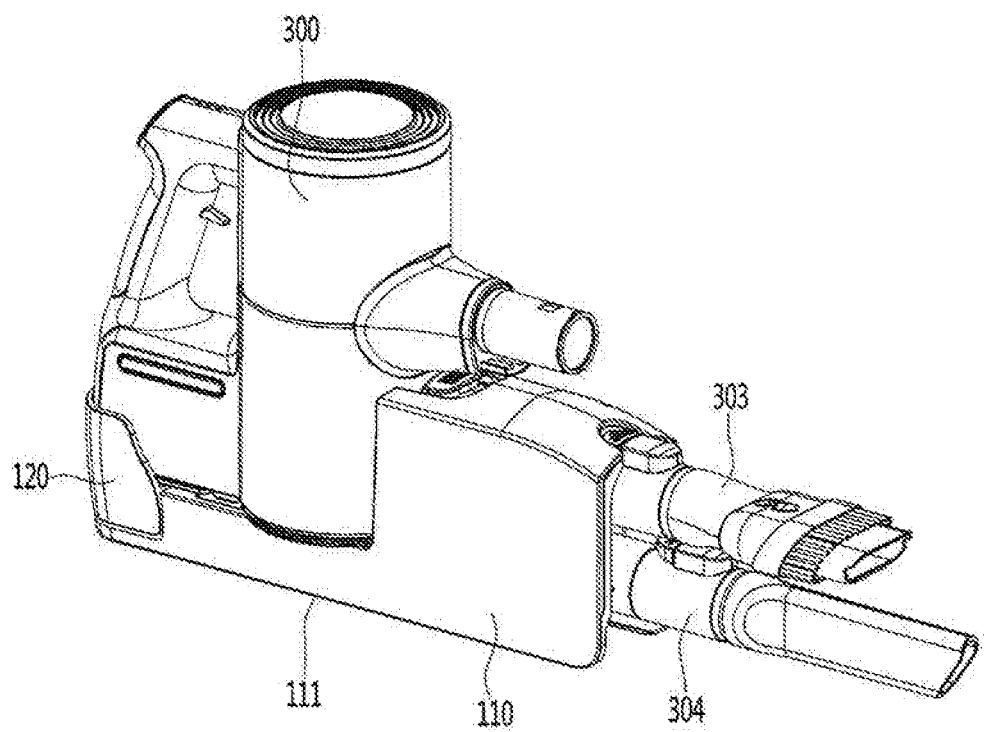
FIG. 12 is a view illustrating a state in which a charging stand body is supported by a floor.

FIG. 12 is a view illustrating a state in which the charging stand body is supported by the floor.

Referring to FIG. 12, the rear surface 111 of the charging stand body 110 may be supported by the floor. To achieve this, the rear surface 111 of the charging stand body 110 may have a planar shape. In this way, because the charging stand body 110 may be held in various schemes according to a usage situation, user convenience may be improved.

Hereinafter, a cleaner holder according to a second embodiment of the present disclosure will be described in detail.

Figure 13:
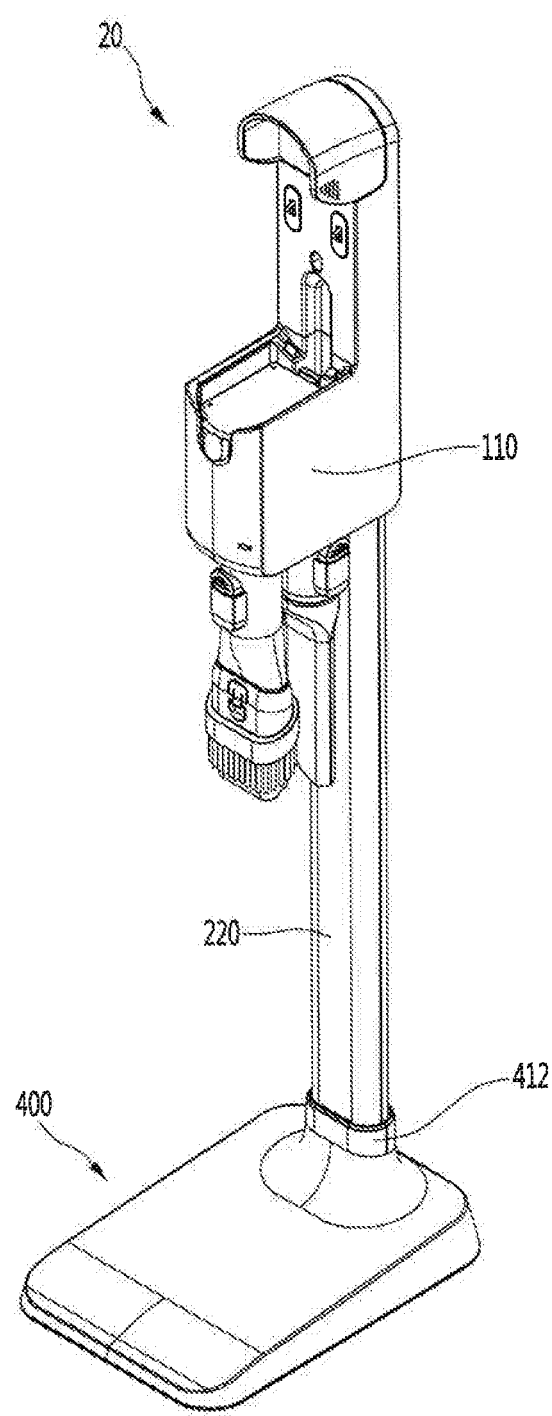
FIG. 13 is a perspective view illustrating a cleaner holder according to a second embodiment of the present disclosure.

FIG. 13 is a perspective view illustrating a cleaner holder according to a second embodiment of the present disclosure.

Referring to FIG. 13, the cleaner holder 20 according to a second embodiment of the present disclosure includes a charging stand body 110 for charging a cleaner, a support 220 connected to the charging stand body 110 to support the charging stand body 110, and a base 400 supported by the floor and coupled to a lower portion of the support 220.

The base 400 may include a first neck 412 into which the support 220 is inserted. The first neck 412 may be formed to surround the support 220. In detail, an upper end of the first neck 412 is curved inward to surround an outer peripheral surface of a lower end of the support 220.

When compared with the cleaner holder 10, the cleaner holder 20 according to the present embodiment has a different configuration of the base 400 and substantially the same configurations of other components. Thus, the base 400 will be mainly described below.

Figure 14:
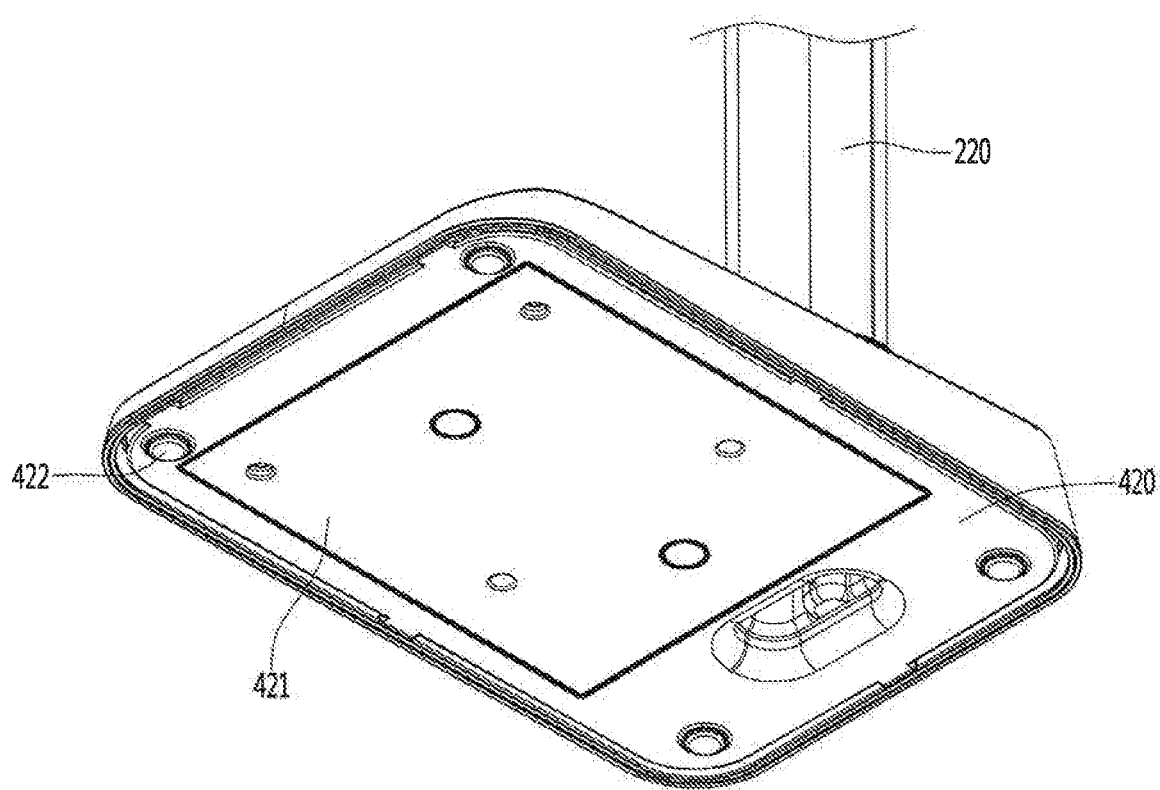
FIG. 14 is a bottom view of a base of FIG. 13.
Figure 15:
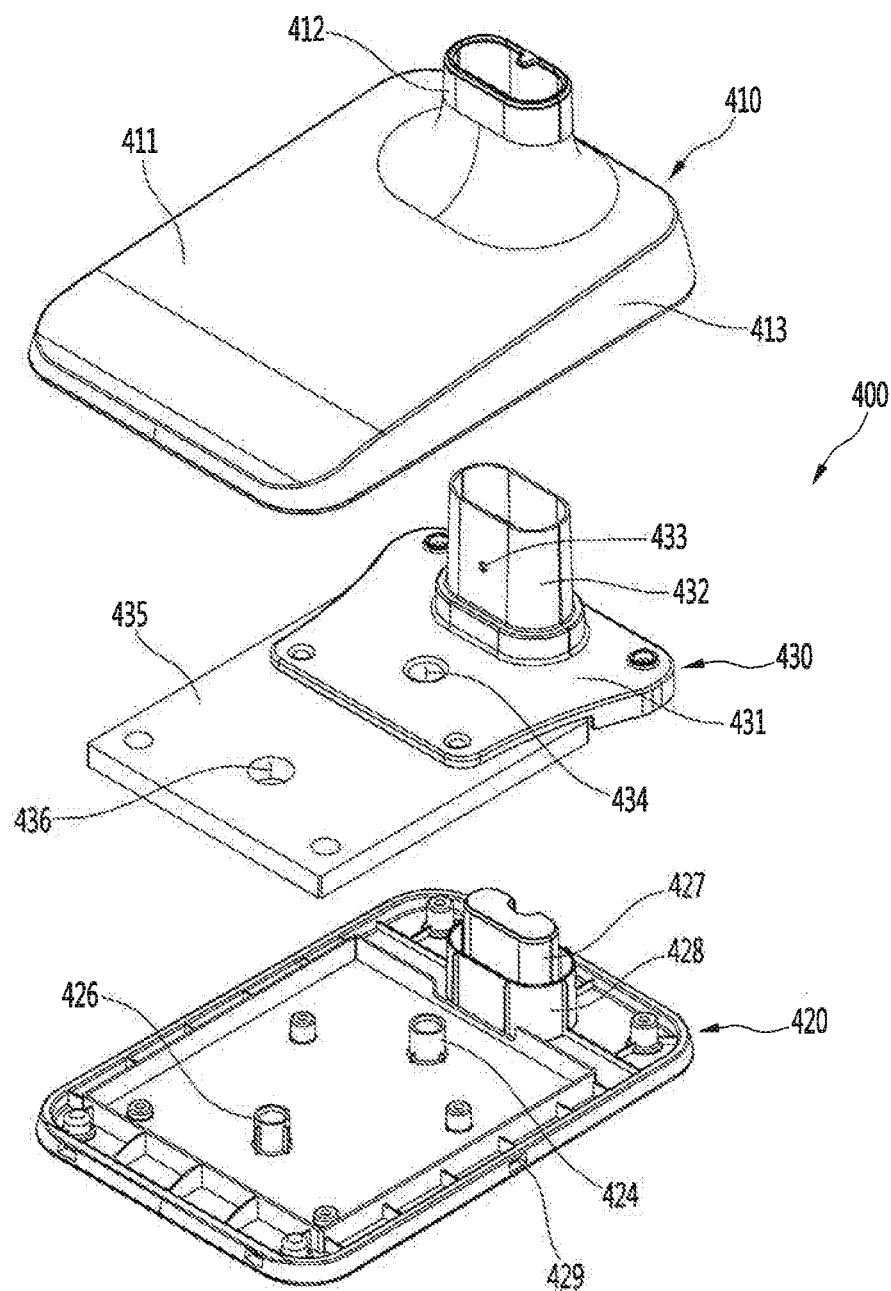
FIG. 15 is an exploded perspective view illustrating the base of FIG. 13.
Figure 16:
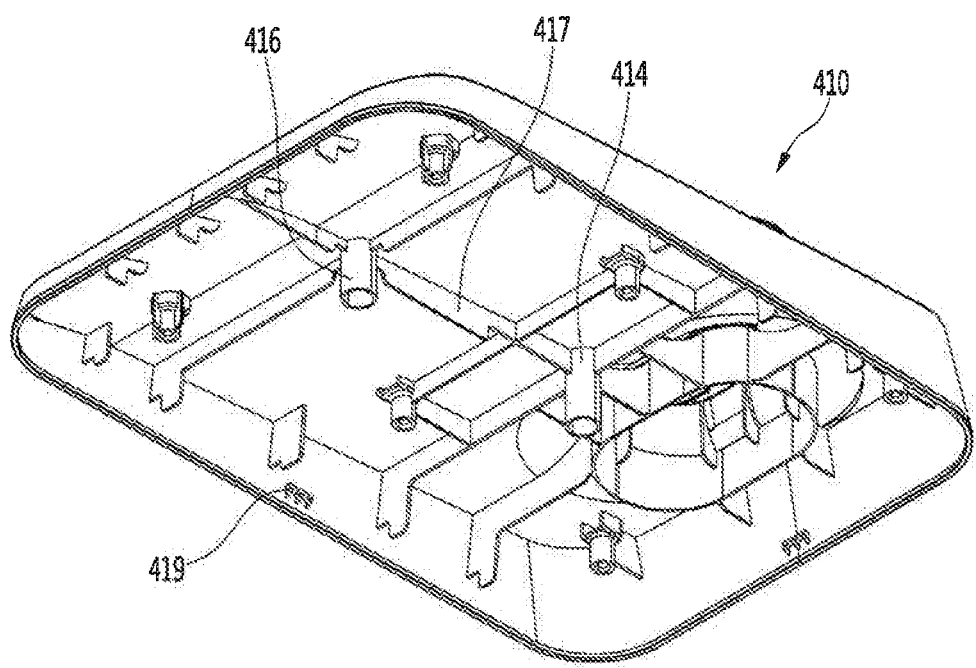
FIG. 16 is a bottom view of an upper cover of FIG. 14.

FIG. 14 is a bottom view of the base of FIG. 13, FIG. 15 is an exploded perspective view illustrating the base of FIG. 13, and FIG. 16 is a bottom view of an upper cover of FIG. 14.

Referring to FIGS. 14 to 16, the base 400 includes an upper cover 410, a lower cover 420 and an inner base 430. The lower cover 420 is provided below the upper cover 410 and the inner base 430 is provided between the upper cover 410 and the lower cover 420.

The upper cover 410 may include an upper surface 411 and a side surface 413. The upper surface 411 may define an upper surface of the base 400, and the side surface 413 may extend downward from an edge of the upper surface 411.

The upper surface 411 may be inclined downward as it goes forward from a side of the support 220. A suction nozzle 340 of a cleaner 300 supported by the charging stand body 110 may be in contact with the upper surface 411.

The first neck 412 may be provided on the upper surface 411 of the upper cover 410. The first neck 412 may protrude upward from the upper surface 411. An upper end of the first neck 412 may be formed to surround an outer peripheral surface of the support 220.

The inner base 430 is arranged below the upper cover 410. A contact rib 417 in contact with the inner base 430 may be provided below the upper cover 410. The contact rib 417 functions to maintain a distance between the upper cover 410 and the inner base 430 constantly as the contact rib 417 comes into contact with an upper surface of the inner base 430.

A bottom surface 421 of the lower cover 420 is supported by the floor and is coupled to the upper cover 410 on an upper side thereof.

A friction part 422 for maintaining predetermined friction force between the bottom surface 421 and the floor may be provided on the bottom surface 421 of the lower cover 420. The friction part 422 may include a rubber gasket or spike. When the floor is formed of a smooth material such as wood, marble and a tile, the rubber gasket may be used as the friction part 422. Further, when the cleaner holder 20 is used on a carpet, the spike may be used as the friction part 422.

The inner base 430 may include a body 431. The body 431 may be interposed between the upper cover 410 and the lower cover 420 and may be coupled to the upper cover 410 and the lower cover 420.

The body 431 may be formed of aluminum and may be manufactured in a die casting scheme. Thus, a plurality of bodies 431 may be manufactured to have the same shape.

The inner base 430 may include a second neck 432 provided in the body 431 and coupled to the support 220. The second neck 432 may extend upward from the body 431 and may surround at least a portion of a lower end of the support 220.

Meanwhile, the second neck 432 may be in surface contact with the support 220. Accordingly, an impulse transferred from the second neck 432 to the support 220 is dispersed, so that damage of the support 220 caused by friction between the support 220 and the second neck 432 may be minimized.

As the length of the second neck 432 is increased, a contact area between the second neck 432 and an outer peripheral surface of the support 220 is increased. Thus, as the length of the second neck 432 is increased within a predetermined range, stability of the support 220 may be improved. Thus, the second neck 432 may be manufactured to a minimum length for stable support of the support 220 or more.

Further, a coupling part 433 for coupling with the support 220 may be formed in the second neck 432. The coupling part 433 may include a hole.

The inner base 430 may further include an auxiliary base 435 coupled to the body 431. The auxiliary base 435 may be coupled to a front side of the body 431.

The auxiliary base 435 may be formed of a material having a larger density than other components of the cleaner holder 20, and the center of gravity of the inner base 430 may be formed on a side of the auxiliary base 435. For example, the auxiliary base 435 may be formed of metal, and the support, the body, the charging stand body, the upper cover and the lower cover may be formed of plastic.

Furthermore, the center of gravity of the base 400 may be located, by the auxiliary base 435, on a front side of a line by which the front-rear length of the base 400 is bisected. Thus, the cleaner 300 coupled to an upper side of the cleaner holder 20 may be stably supported. Because the cleaner 300 is coupled to an upper portion of the cleaner holder 20 as illustrated in FIG. 4, the center of gravity of a coupled body of the cleaner holder 20 and the cleaner 300 (may include an extra battery) is biased to an upper side and a front side, and thus, stability may deteriorate. However, the center of gravity of the coupled body of the cleaner holder 20 and the cleaner 300 may be adjacent to the floor due to the auxiliary base 435, so that stability of the coupled body of the cleaner holder 20 and the cleaner 300 may be improved.

A coupling boss (see FIG. 17) inserted into the auxiliary base 435 may be provided in the body 431. The body 431 may be coupled to the auxiliary base 435 by the coupling boss 437. Unlike the drawings, the body 431 and the auxiliary base 435 may be integrally manufactured.

A plurality of coupling holes 434 and 436 for coupling with the upper cover 410 and the lower cover 420 may be formed in the auxiliary base 430. The plurality of coupling holes 434 and 436 may be formed in the body 431 or the auxiliary base 435.

The plurality of coupling holes 434 and 436 may include a first coupling hole 434 formed in the body 431 and a second coupling hole 436 formed in the auxiliary base 435. The first coupling hole 434 and the second coupling hole 436 may be plural as illustrated. For convenience of description, in the present specification, the description will be made assuming that the number of the first coupling hole 434 and the number of the second coupling hole 436 is one.

The lower cover 420 may further include a third neck 427 for coupling with the support 220. The third neck 427 may extend upward from the lower cover 420 and may be coupled to the support 220. A portion of the bottom surface of the lower cover 420, which overlaps a vertical lower side of the second neck 427, may be recessed upward.

The lower cover 420 may further include a support rib 428 supporting the inner base 430. The support rib 428 may be spaced apart from the third neck 427 by a predetermined interval and may have a shape surrounding the third neck 427. Further, an upper end of the support rib 428 may be lower than an upper end of the third neck 427.

Fastening holes 429 for coupling with the upper cover 410 may be formed in the lower cover 420. The fastening holes 429 may be formed on side surfaces of the lower cover 420. Fastening bosses 419 inserted into the fastening holes 429 may be provided in the upper cover 410.

The lower cover 420 may further include a plurality of lower coupling members 424 and 426 for coupling with the inner base 430. The plurality of lower coupling members 424 and 426 may be inserted into the first coupling hole 434 and the second coupling hole 436 provided in the inner base 430, respectively. As illustrated, although the first coupling hole 434 and the second coupling hole 436 may be arranged in one line, the present disclosure is not limited thereto.

The upper cover 410 may further include a plurality of upper coupling members 414 and 416 for coupling with the inner base 430. The plurality of upper coupling members 424 and 426 may be inserted into the first coupling hole 434 and the second coupling hole 436 provided in the inner base 430, respectively.

Hereinafter, a coupling relationship between the upper cover 410, the lower cover 420 and the inner base 430 will be described in detail.

Figure 17:
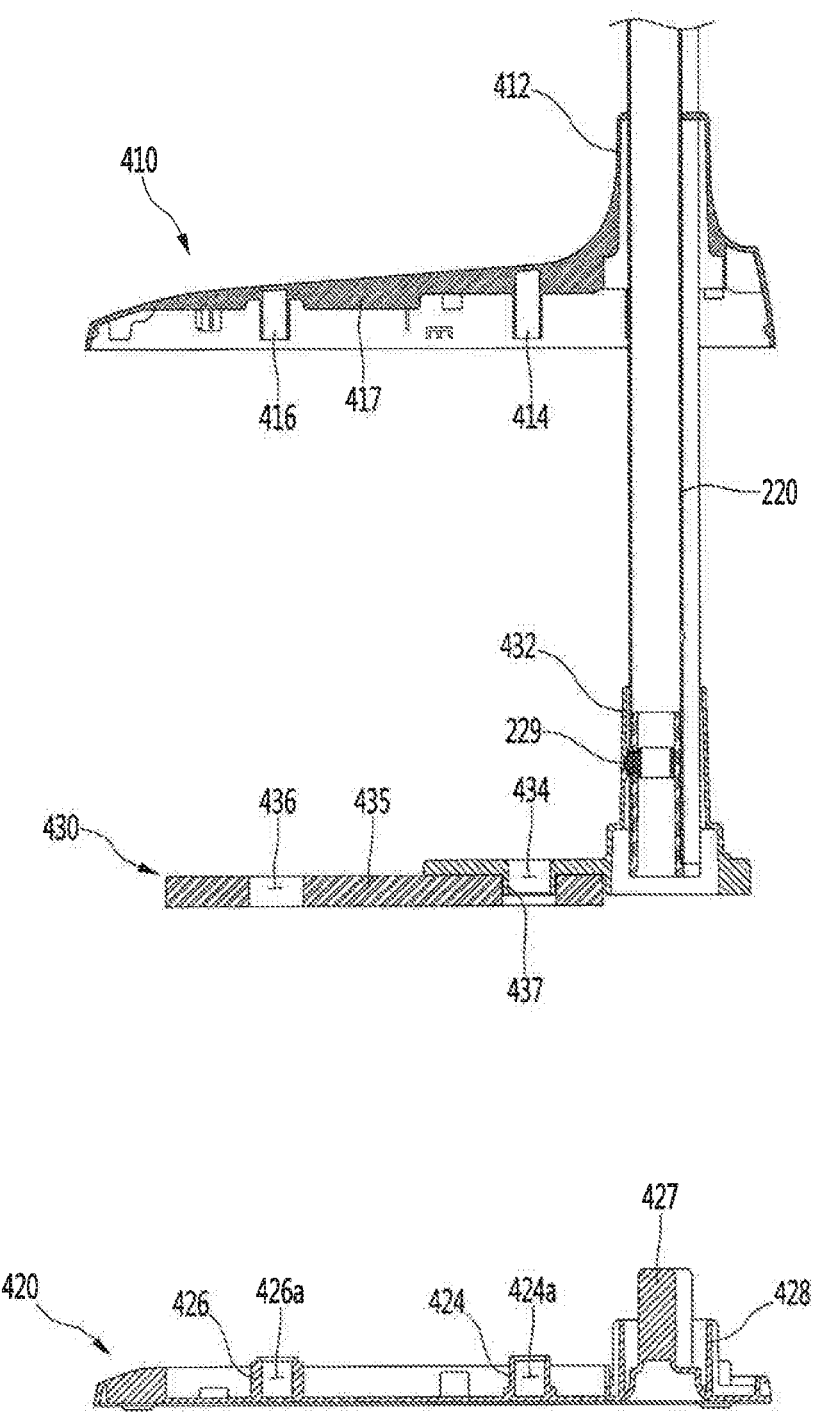
FIG. 17 is an exploded sectional view illustrating an inner base of FIG. 15.
Figure 18:
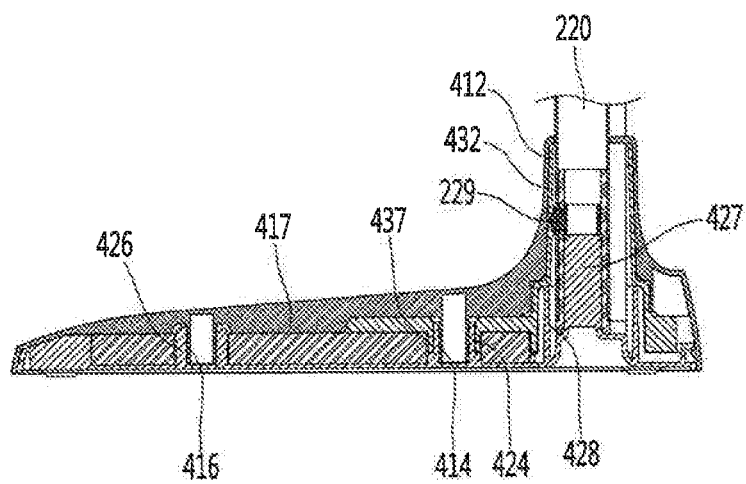
FIG. 18 is a sectional view illustrating the inner base.

FIG. 17 is an exploded sectional view illustrating the inner base, and FIG. 18 is a sectional view illustrating the inner base.

Referring to FIGS. 17 and 18, a fastening unit 229 for coupling with the inner base 430 may be provided in the support 220. The fastening unit 229 may be inserted into the support 220 through an opening formed at a lower end of the support 220. The fastening unit 229 may include a boss inserted in the coupling part 433 (see FIG. 15) provided in the second neck 432. The elastic member provided inside the support 220 is connected to the boss of the fastening unit 229 so that the support 220 may be elastically supported. Accordingly, the boss may be selectively inserted/withdrawn into/from an inside of the support 220. Meanwhile, the fastening unit 229 may be coupled to the third neck 427 not to the support 220.

An opening inserted into the third neck 427 may be formed at a lower end of the support 220. When the third neck 427 is inserted into the opening of the support 220, an outer peripheral surface of the third neck 427 may come into contact with an inner peripheral surface of the opening of the support 220. Accordingly, the lower cover 420 may be coupled to the support 220 to support the support 220.

The support rib 428 may come into contact with the bottom surface of the inner base 430 to support the inner base 430. Further, the support rib 428 may be provided on a vertical lower side of the second neck 432. Accordingly, the support rib 428 may support loads transferred through the second neck 432.

The plurality of upper coupling members 414 and 416 may include a first upper coupling member 414 and a second upper coupling member 416. The plurality of lower coupling members 424 and 416 may include a first lower coupling member 424 and a second lower coupling member 426.

Both the first upper coupling member 414 and the first lower coupling member 424 may be inserted into the first coupling hole 434. Further, the second upper coupling member 416 and the second lower coupling member 426 may be inserted into the second coupling hole 436. Accordingly, the upper cover 410, the lower cover 420 and the inner base 430 may be firmly coupled to each other.

An outer peripheral surface of the first lower coupling member 424 may come into close contact with an inner peripheral surface of the first coupling hole 434. Accordingly, the first lower coupling member 424 may be fixed to the first coupling hole 434.

A first insertion groove 424a into which the first upper coupling member 414 is inserted may be formed in the first lower coupling member 424. An outer peripheral surface of the first upper coupling member 414 may contact or come into close contact with an inner peripheral surface of the first insertion groove 424a on at least a portion thereof. The first upper coupling member 414 is inserted into the first insertion groove 424a to be coupled to the first lower coupling member 424.

An outer peripheral surface of the second lower coupling member 426 may come into close contact with an inner peripheral surface of the second coupling hole 436. Accordingly, the second lower coupling member 426 may be fixed to the second coupling hole 436.

A second insertion groove 426a into which the second upper coupling member 416 is inserted may be formed in the second lower coupling member 426. An outer peripheral surface of the second upper coupling member 416 may contact or come into close contact with an inner peripheral surface of the second insertion groove 426a on at least a portion thereof. The second upper coupling member 416 is inserted into the second insertion groove 426a to be coupled to the second lower coupling member 426. Torsion of the inner base 430 may be prevented according to such a mechanical fastening scheme.

Meanwhile, an overturning angle and an overturning force in the front-rear direction and in the left-right direction of the cleaner holder 20 according to the present embodiment will be described below. Here, the overturning angle means a slope value of a floor when the cleaner holder 20 is turned over and the overturning force means force for turning over the cleaner holder 20.

TABLE 1

|  | Front | Rear | Left | Right |
|---|---|---|---|---|
| Overturning angle (°) | 22 | 22 | 15.5 | 15.5 |

TABLE 1-continued

|  | Front | Rear | Left | Right |
|---|---|---|---|---|
| Overturning force (Kgf) | 1.08 | 0.95 | 0.72 | 0.72 |

Hereinafter, a cleaner holder according to a third embodiment of the present disclosure will be described in detail.

Figure 19:
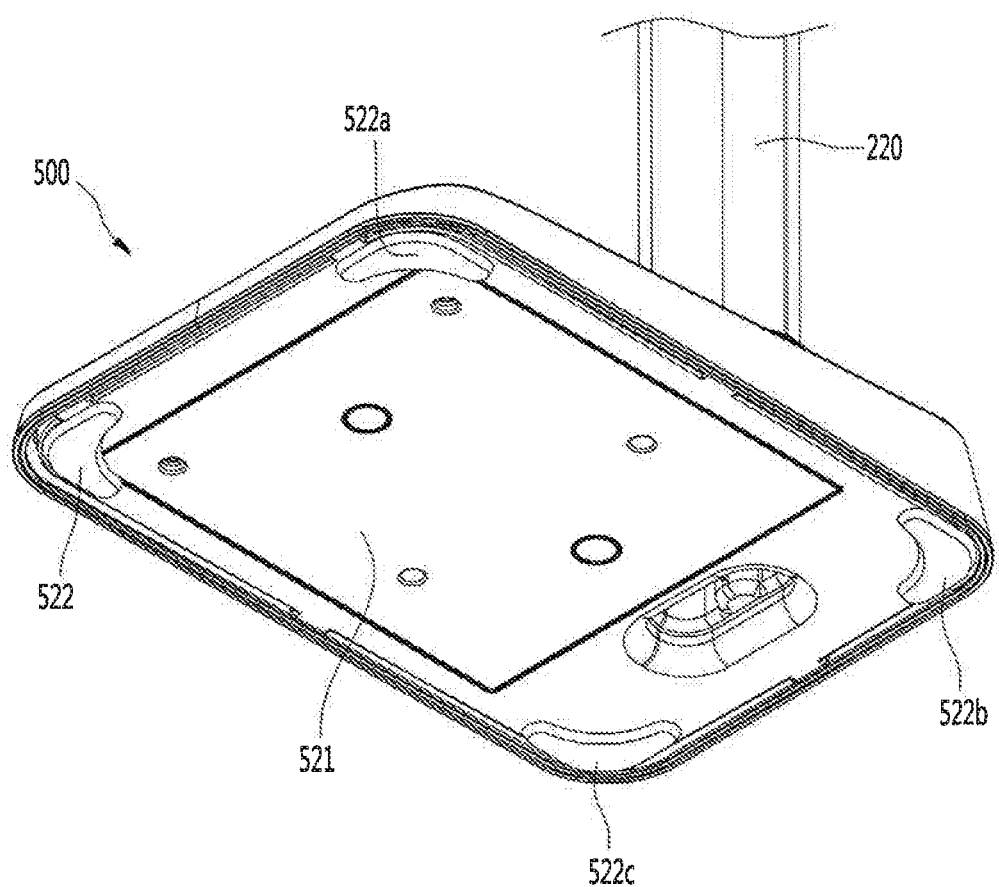
FIG. 19 is a bottom surface illustrating a base of a cleaner holder according to a third embodiment of the present disclosure.

FIG. 19 is a bottom surface illustrating a base of a cleaner holder according to a third embodiment of the present disclosure.

Referring to FIG. 19, the cleaner holder according to a third embodiment of the present disclosure is substantially the same as the cleaner holder 10 according to the first embodiment or the cleaner holder 20 according to the second embodiment, except for some configurations of the base 500. Thus, contents overlapping with the prior embodiment will be omitted.

The cleaner holder according to the present embodiment includes a support 220 and a base 500 connected to a lower end of the support 220. A bottom surface 521 of a lower cover of the base 500 is supported on a floor.

Friction parts 522 for maintaining predetermined friction force between a floor and the friction parts 522 may be provided on the bottom surface 521 of the lower cover of the base 500. The friction parts 522 may include a rubber gasket, a spike or the like. When the floor is formed of a smooth material such as wood, marble and a tile, the rubber gasket may be used as the friction parts 522. Further, when the cleaner holder 20 is used on a carpet, the spike may be used as the friction parts 422.

The friction parts 522 according to the present embodiment are similar to the friction parts 422 according to a second embodiment but the friction parts 522 and the friction parts 422 have different shapes and locations. In detail, the friction parts 522 according to the present embodiment are larger than the friction parts 422 according to the second embodiment, and a plurality of friction parts 522 (reference numerals 522, 522a, 522b and 522c of FIG. 19) may be provided at the outermost portions of edges of the bottom surface 521 of the lower cover of the base 500.

Further, at least portions of the friction parts 522 according to the present embodiment may have shapes corresponding to edges of the bottom surface 521 of the lower cover of the base 500 such that a friction effect is maximized. In detail, the friction parts 522 may have a curved shape, as illustrated. Accordingly, the friction parts 522 according to the present embodiment have large close contact areas with a floor as compared with the friction parts 422 according to the second embodiment, and shaking flow in a left-right direction and in a front-rear direction of the charging stand may be improved.

Figure 20:
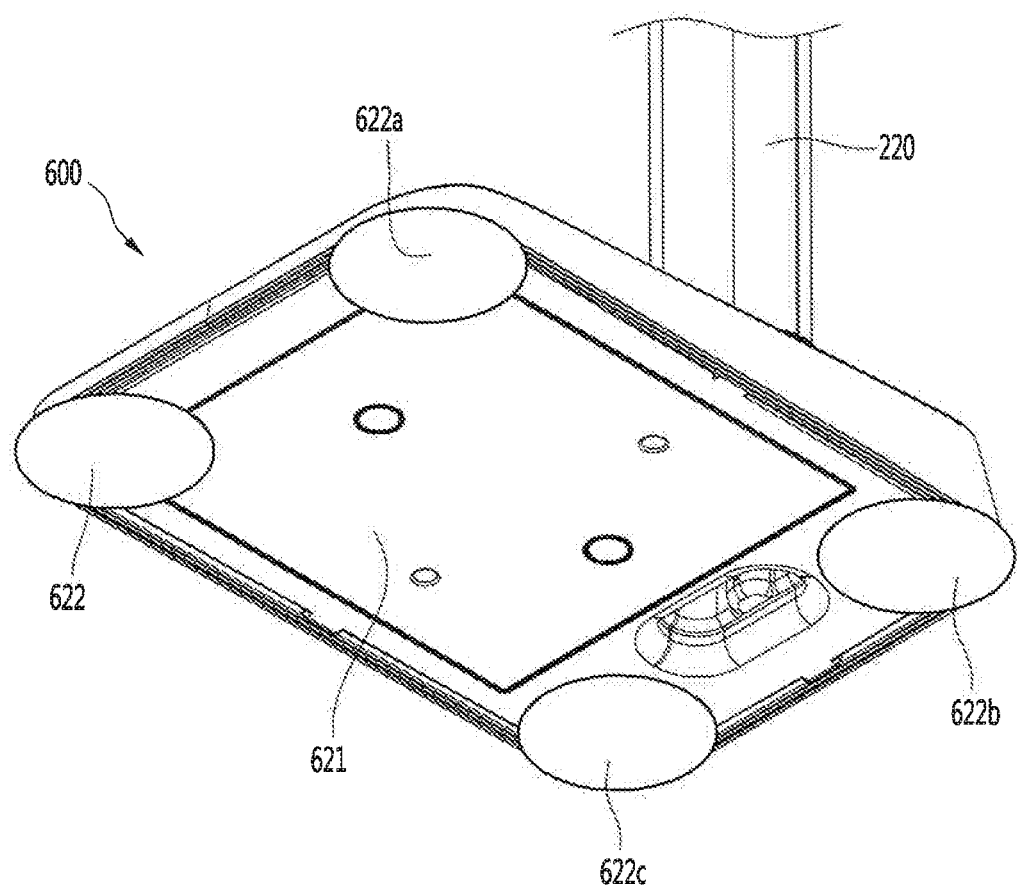
FIG. 20 is a bottom view illustrating the base for a cleaner holder according to a fourth embodiment of the present disclosure.
Figure 21:
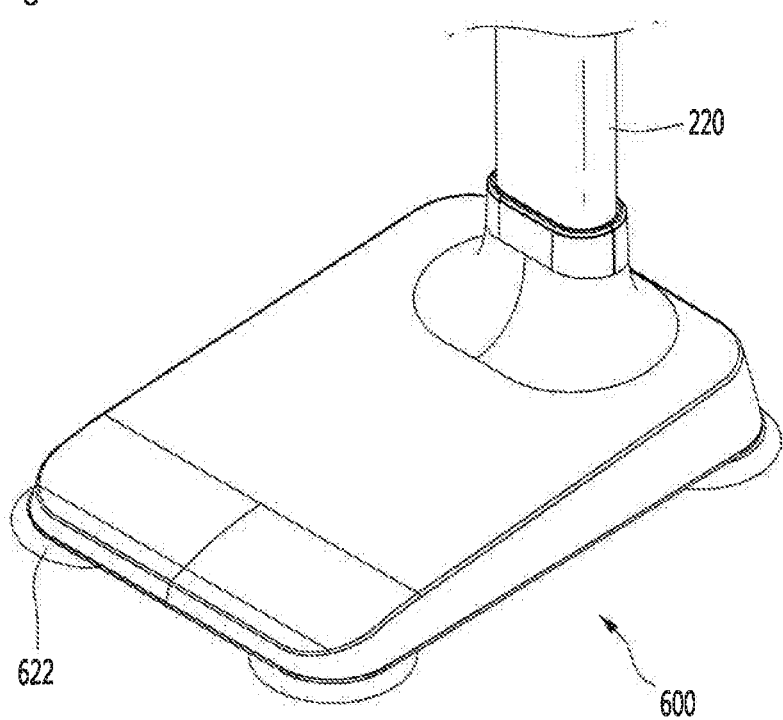
FIG. 21 is a perspective view of the base of FIG. 20.

FIG. 20 is a bottom view illustrating the base for a cleaner holder according to a fourth embodiment of the present disclosure, and FIG. 21 is a perspective view illustrating the base of FIG. 20.

Referring to FIGS. 20 and 21, the cleaner holder according to the present embodiment may be substantially identical to the cleaner holder 10 according to the first embodiment or the cleaner holder 20 according to the second embodiment, except for some configurations of the base 600. Thus, contents overlapping with the prior embodiment will be omitted.

The cleaner holder according to the present embodiment includes a support 220 and a base 600 connected to a lower end of the support 220. A bottom surface 621 of a lower cover of the base 600 is supported on a floor.

Suction parts 622 for close contact with a floor may be provided on the bottom surface 621 of the lower cover of the base 600. The suction parts 622 may be in close contact with the floor as negative pressure is formed in close contact with the floor. As illustrated, the suction parts 622 may be provided at four edges of the bottom surface 621 of the lower cover of the base 600 (reference numerals 622, 622a, 622b and 622c in FIG. 20).

An overturning angle and an overturning force in the front-rear direction and in the left-right direction of the cleaner holder according to the present embodiment will be described below. An improvement value for the overturning angle and an improvement value for the overturning force are values obtained by comparing the overturning angle and the overturning force of the cleaner holder according to the present embodiment with the overturning angle and the overturning force (see Table 1) of the cleaner holder 20 according to the second embodiment.

TABLE 2

|  | Front | Rear | Left | Right |
|---|---|---|---|---|
| Overturning angle (°) | 40.0 | 40.0 | 29.0 | 29.0 |
| Improvement value for overturning angle (°) | 18 | 18 | 13.5 | 13.5 |
| Overturning force (Kgf) | 5.89 | 4.09 | 5.17 | 5.17 |
| Improvement value for overturning force (Kgf) | 4.81 | 3.14 | 4.45 | 4.45 |

In this way, the overturning angle and the overturing force of the cleaner holder according to the present embodiment are largely increased as compared with the cleaner holder according to the second embodiment. Accordingly, even when external force is applied to the cleaner holder according to the present embodiment, a phenomenon in which the cleaner holder is turned over within a predetermined range may be prevented.

Figure 22:
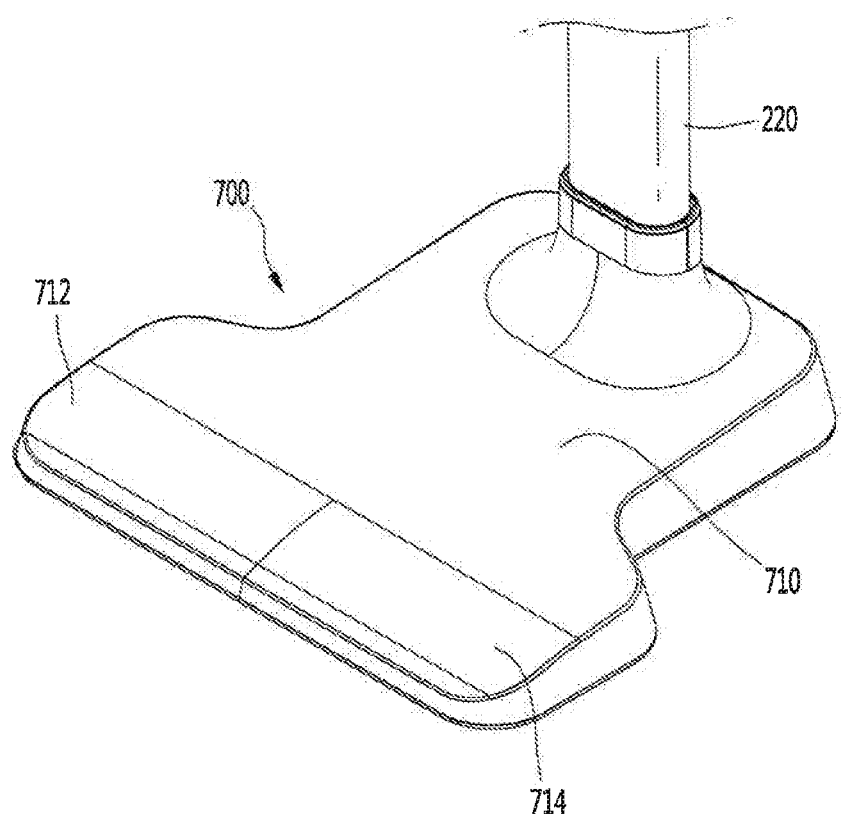
FIG. 22 is a perspective view illustrating the base for a cleaner holder according to a fifth embodiment of the present disclosure.

FIG. 22 is a perspective view illustrating the base for a cleaner holder according to a fifth embodiment of the present disclosure.

Referring to FIG. 22, the cleaner holder according to the present embodiment is substantially the same as the cleaner holder 10 according to the first embodiment or the cleaner holder 20 according to the second embodiment, except for the shape of the base 700. Thus, contents overlapping with the prior embodiment will be omitted.

The cleaner holder according to the present embodiment includes a support 220 and a base 700 connected to a lower end of the support 220. A bottom surface of the base 700 is supported on a floor.

The base 700 may include a base body 710, a first extension 712 extending in one direction of the base body 710 and a second extension 714 extending in the other direction. As illustrated, the first extension 712 may extend rightward from a front side of the base body 710 by a predetermined length. The second extension 714 may extend leftward from a front side of the base body 710 by a predetermined length. Accordingly, the base 700 may have a "T" shape. Further, the first extension 712 and the second extension 714 may be supported on a floor. Accordingly, the overturning angle and the overturning force in the left-right direction of the base 700 may be increased.

The first extension 712 and the second extension 714 are provided on a front side of the base body 710, so that a width of a front portion of the base 700 is increased. Accordingly, an overturning angle and an overturing force toward a front side as well as an overturning angle and an overturning force in the left-right direction of the cleaner holder according to the present embodiment may be increased.

An overturning angle and an overturning force in the front-rear direction and in the left-right direction of the cleaner holder according to the present embodiment will be described below. An improvement value for the overturning angle and an improvement value for the overturning force are values obtained by comparing the overturning angle and the overturning force of the cleaner holder according to the present embodiment with the overturning angle and the overturning force (see Table 1) of the cleaner holder 20 according to the second embodiment.

TABLE 3

|  | Rear | Front | Left | Right |
| --- | --- | --- | --- | --- |
| Overturning angle (°) | 28.5 | 23.5 | 31.5 | 31.5 |
| Improvement value for overturning angle (°) | 6.5 | 1.5 | 16.0 | 16.0 |
| Overturning force (Kgf) | 1.11 | 1.34 | 1.41 | 1.41 |
| Improvement value for overturning force (Kgf) | 0.03 | 0.39 | 0.69 | 0.69 |

In this way, the overturning angle and the overturing force of the cleaner holder according to the present embodiment are largely increased as compared with the cleaner holder according to the second embodiment. Accordingly, even when external force is applied to the cleaner holder according to the present embodiment, a phenomenon in which the cleaner holder is turned over within a predetermined range may be prevented.

A width of the rear side of the base 700 is formed to be narrower than a width of the front side of the base 700, and thus even when the overturning angle and the overturning force toward a rear side of the cleaner holder are small, the cleaner holder may be prevented from being turned over rearward by the first wall surface fixing part 140 or the second wall surface fixing part 170 (see FIGS. 4 and 5).

Figure 23:
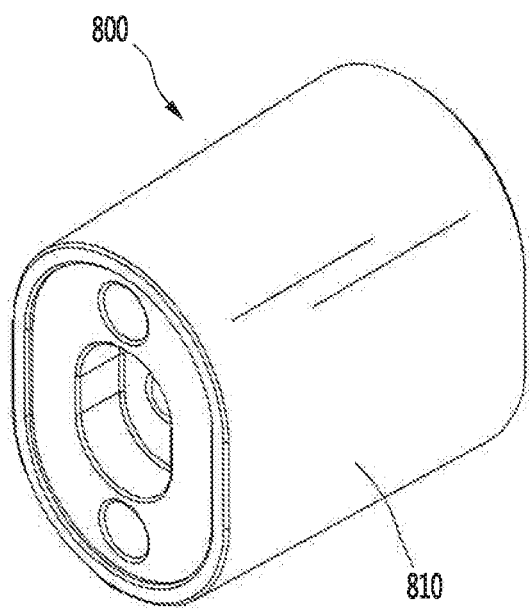
FIGS. 23 and 24 are perspective views illustrating a wall surface fixing part according to a sixth embodiment of the present disclosure.
Figure 24:
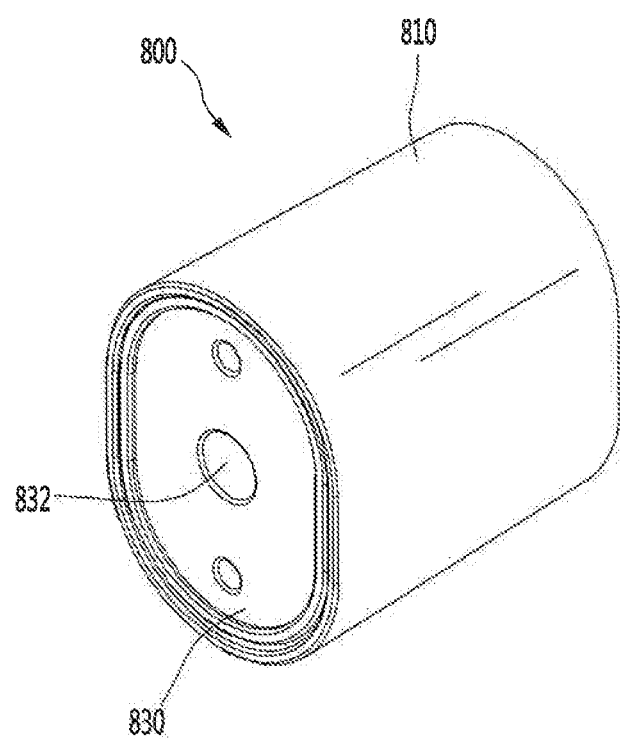
Figure 25:
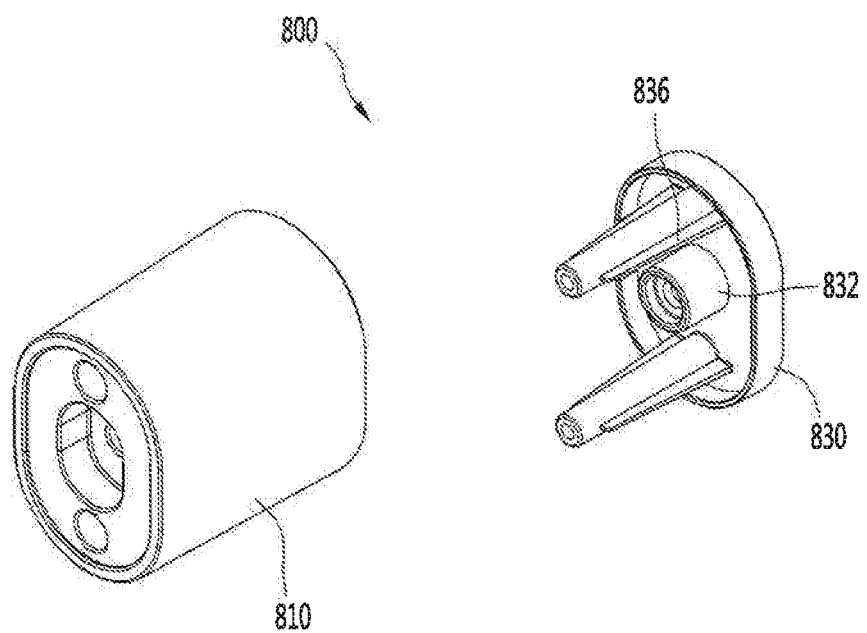
FIG. 25 is an exploded perspective view illustrating a wall surface fixing part of FIG. 23.
Figure 26:
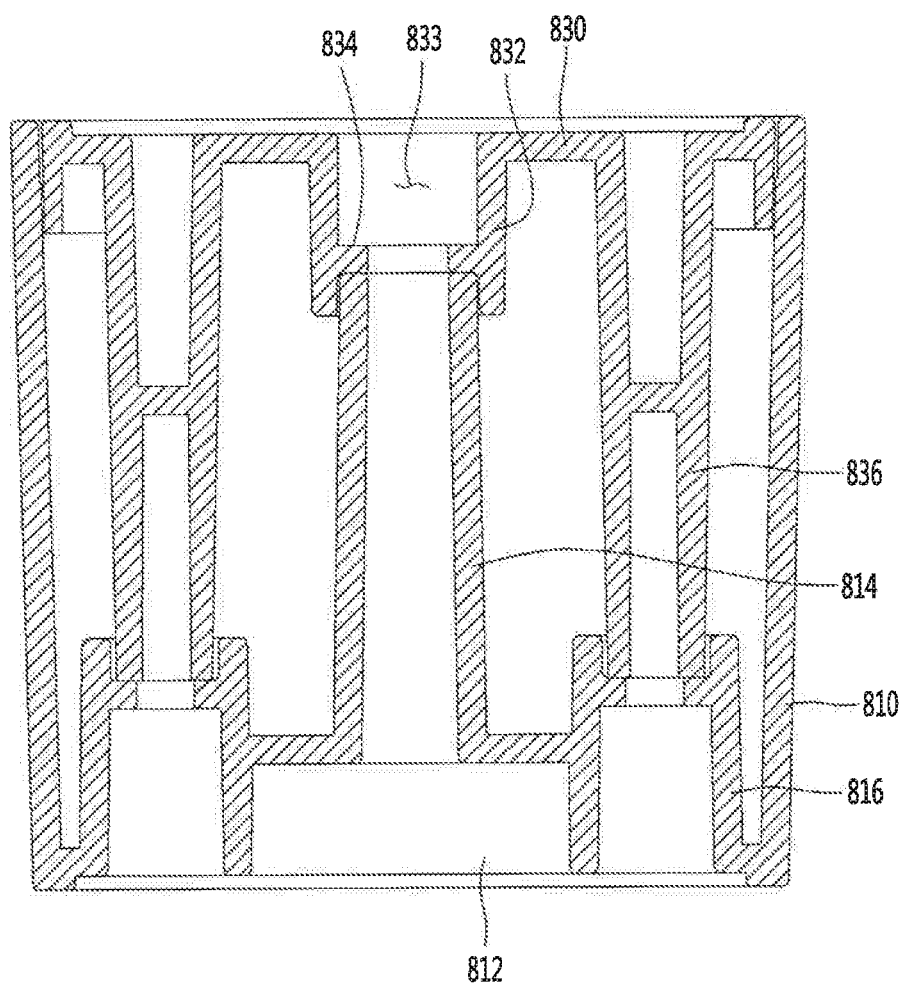
FIG. 26 is a sectional view illustrating the wall surface fixing part of FIG. 23.

FIGS. 23 and 24 are perspective views illustrating a wall surface fixing part according to a sixth embodiment of the present disclosure, FIG. 25 is an exploded perspective view illustrating a wall surface fixing part of FIG. 23, and FIG. 26 is a sectional view illustrating the wall surface fixing part of FIG. 23.

Figure 27:
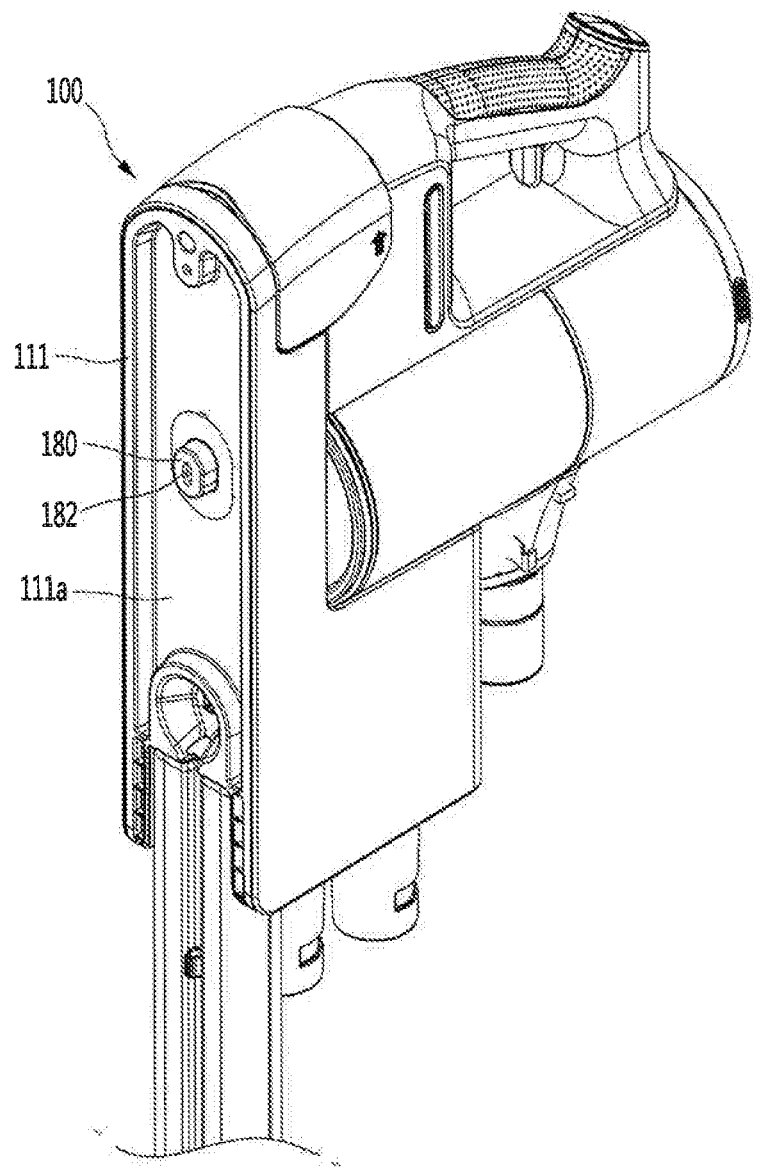
FIG. 27 is a perspective view illustrating a portion of the charging stand having a fixing part coupling protrusion according to a sixth embodiment of the present disclosure.
Figure 28:
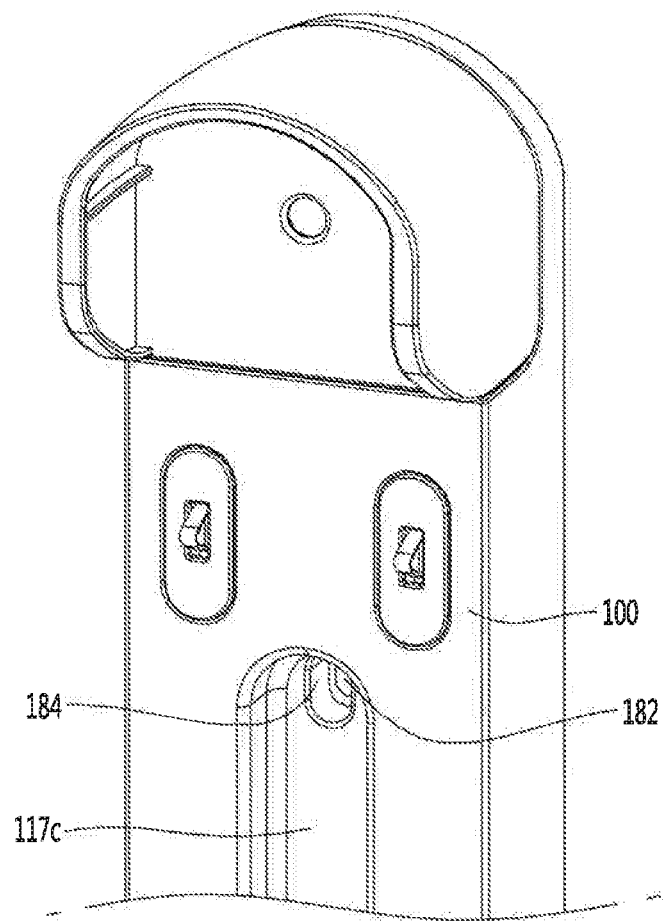
FIG. 28 is a perspective view illustrating a portion of the charging stand having a recessed part in which a fastening member is to be accommodated according to a sixth embodiment of the present disclosure.

FIG. 27 is a perspective view illustrating a portion of a charging stand having a fixing part coupling boss according to the sixth embodiment of the present disclosure, and FIG. 28 is a perspective view illustrating a portion of the charging stand having a recessed part in which a fastening member is accommodated according to the sixth embodiment of the present disclosure.

Referring to FIGS. 22 to 28, a wall surface fixing part 800 according to the sixth embodiment of the present disclosure may be fixed to the wall surface while being coupled to the charging stand 100. When the wall surface fixing part 800 is fixed to the charging stand 100 and the wall surface, the charging stand 100 may be prevented from being turned over even when the charging stand 100 stands up.

The wall surface fixing part 800 may include a first body 810 and a second body 830 fastened to the first body 810.

The first body 810 may be in contact with the rear surface 110 of the charging stand 100 and the second body 830 may be in contact with the wall surface.

A boss accommodating part 812 in which a fixing part coupling boss 180 provided on a rear surface 111 of the charging stand 100 is accommodated may be provided in the first body 810.

The first body 810 may include a guide 814 extending from the boss accommodating part 812. The guide 814 may guide a fastening member configured to fix the wall surface fixing part 800 to the wall surface (see reference numeral 910 in FIG. 29).

The first body 810 may include first fastening bosses 816 for fastening with the second body 830 and the second body 830 may include second fastening bosses 836 fastened to the first fastening bosses 816 by a screw.

The second body 830 may further include a guide accommodating part 832 in which the guide 814 is accommodated.

The guide accommodating part 832 may further include a contact surface 834 in contact with an end of the guide 814. The guide accommodating part 832 may include a block accommodating space 833 in which a portion of a fixing block (see reference numeral 910 in FIG. 9) for fixing the wall surface fixing part 800 to the wall surface is to be accommodated.

The block accommodating space 833 may be formed as a portion of the second body 830 is recessed toward a boss accommodating part 812 of the first body 810.

Meanwhile, a recessed surface 111*a* recessed forward is formed on the rear surface 111 of the charging stand 100 and the fixing part coupling boss 180 is formed on the recessed surface 111*a*.

Here, the fixing part coupling boss 180 protrudes from the recessed surface 111*a*, and a protrusion length of the fixing part coupling boss 180 is formed to be smaller than a recessed depth of the recessed surface 111*a*. Thus, even when the charging stand 110 is directly fixed to the wall surface or is placed on the floor as illustrated in FIGS. 11 and 12, the fixing part coupling boss 180 may be prevented from being in contact with the wall surface or the floor.

A hole 182 through which the fastening member (see reference numeral 920 of FIG. 29) passes may be formed in the fixing part coupling boss 180.

A groove 117*c* having the same shape and the same function may be formed on a front surface of the charging stand 100, as illustrated in FIG. 8. A space part 184 for providing a space through which the fastening member (see reference numeral 920 of FIG. 29) is to pass may be additionally formed in the groove 117*c*.

Thus, the fastening member (see reference numeral 920 of FIG. 29) may be inserted from a front side of the charging stand 100 via the space part 184 and the hole 182 of the fixing part coupling boss 180 into the wall surface fixing part 800. Further, the fastening member (see reference numeral 920 of FIG. 29) may pass through the guide accommodating part 832 via the guide 814.

Figure 29:
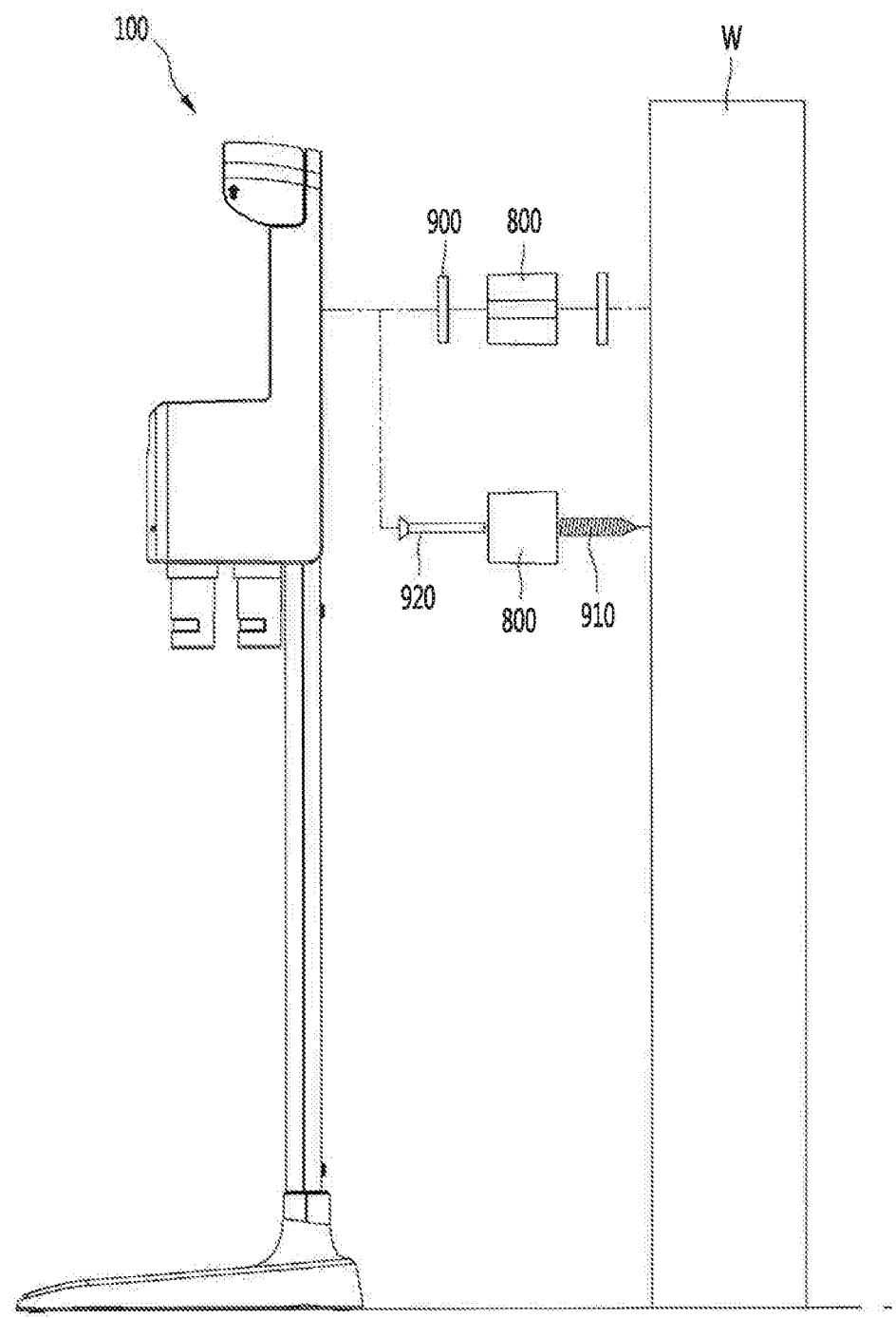
FIG. 29 is a view illustrating a method for fixing the charging stand to a wall surface using a wall surface fixing part according to a sixth embodiment of the present disclosure.

FIG. 29 is a view illustrating a method for fixing the charging stand to a wall surface using a wall surface fixing part according to the sixth embodiment of the present disclosure.

Referring to FIGS. 23 to 29, for example, the wall surface fixing part 800 may be fixed to the charging stand 100 and a wall surface W by a double-sided tape 900.

That is, the double-sided tape 900 may be attached to a portion near the boss accommodating part 812 on a front surface (surface facing the charging stand 100) of the wall surface fixing part 800, and the double-sided tape 900 may be attached even to the rear surface (surface facing the wall surface) of the wall surface fixing part 800.

In this case, the front surface of the wall surface fixing part 800 may be attached to the charging stand 100, and the rear surface of the wall surface fixing part 800 may be attached to the wall surface W.

When the double-sided tape 900 is used as a fixing means for fixing the wall surface fixing part 800 to the charging stand 100 and the wall surface W, there is an advantage in that the charging stand 100 may be easily moved to a location desired by a user, and the location thereof may be easily fixed.

Meanwhile, in a state in which the wall surface fixing part 800 is interposed between the charging stand 100 and the wall surface W using the fastening member 920 and the fixing block 910, the charging stand 100 may be fixed to the wall surface W.

A portion of the fixing block 910 may be inserted into the wall surface W and the other portion thereof may be accommodated in the block accommodating space 833 of the wall surface fixing part 800. A portion of the fixing block 910 accommodated in the block accommodating space 833 may be in contact with the contact surface 834.

Further, the fastening member 920 may be inserted from a front side of the charging stand 100 via the space part 184 and the hole 182 of the fixing part coupling boss 180 into the guide 814 of the wall surface fixing part 800. Further, the fastening member 920 inserted into the guide 814 may be fastened to the fixing block 910 after passing through the contact part 834.

When the fastening member 920 and the fixing block 910 are used as the fixing means, the charging stand 100 is firmly fixed to the wall surface W, so that the charging stand 100 may be effectively prevented from being turned over.

As another example, the fastening member may be directly fastened to the wall surface W without using the fixing block 910.

Figure 30:
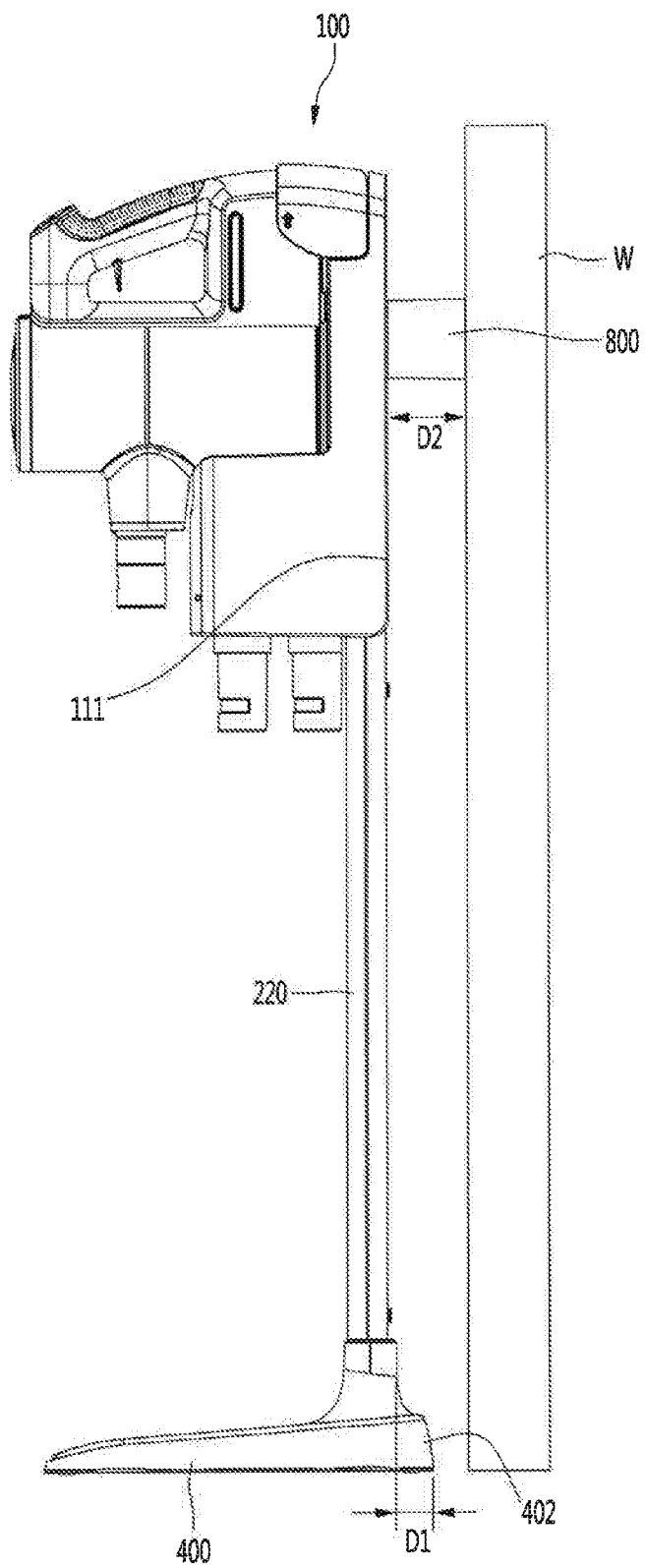
FIG. 30 is a view illustrating a state in which the charging stand is fixed to a wall surface by the wall surface fixing part.

FIG. 30 is a view illustrating a state in which the charging stand is fixed to a wall surface by the wall surface fixing part.

Referring to FIG. 30, the support 220 is connected to a lower side of the charging stand 100, and the base 400 is connected to a lower side of the support 220, so that the base 400 may be placed on a floor.

In this state, the charging stand 100 may be fixed to the wall surface W in any method of the described two fixing methods of FIG. 29.

In a state in which the charging stand 100 is fixed to the wall surface W by the wall surface fixing part 800, the base 400 may be spaced apart from the wall surface W.

That is, a protruding length D1 of a portion 402 of the base 400, which protrudes toward the wall surface W with respect to the support 220 is smaller than a protruding length D2 of the wall surface fixing part 800 protruding from the rear surface 111 of the charging stand 100.

Thus, even when the base 400 is placed on the floor, the charging stand 100 may be fixed to the wall surface W. Here, the protruding length D2 of the wall surface fixing part 800 is ensured, and to prevent damage caused by external force, the wall surface fixing part 800 according to the present disclosure includes a first body 810 and a second body 830 which are coupled to each other.

As the cleaner holder according to the present disclosure includes the charging stand body, the support and the base, an upper portion-centered cleaner may be charged, and at the same time, may be effectively held.

Further, in the cleaner holder according to the present disclosure, as the base has a support multiple support structure, the support may be stably supported, and a neck of the base is in surface contact with the support, so that the support may be minimally damaged.

Further, a center of gravity of the cleaner holder is formed to be close to the floor using an auxiliary base, so that stability of the cleaner holder may be improved.

Further, the charging stand body is directly fixed to the wall surface fixing part, so that the cleaner holder may be prevented from being turned over.

Further, the charging stand body is connected to the charging stand body using a strap, so that the cleaner holder may be prevented from being turned over forward.

The cleaner holder may be prevented from being turned over rearward, by the wall surface fixing part, and turning-over in the left-right direction and in a forward direction may be prevented as the width of the front side of the base may be formed to be larger than the width of the rear side thereof.

What is claimed is:

1. A cleaner holder comprising:
   a charging stand body that includes a charging terminal configured to charge a battery of a cleaner;
   a base configured to rest on a floor;
   a support that connects the charging stand body to the base; and
   a wall surface fixing part that is configured to be interposed between a rear surface of the charging stand body and a wall surface, the wall surface fixing part being configured to fix the charging stand body to the wall surface,
   wherein the wall surface fixing part is configured to maintain a predetermined distance between the rear surface of the charging stand body and the wall surface, and
   wherein, based on the charging stand body being fixed to the wall surface via the wall surface fixing part, a portion of the base protrudes rearward of the support toward the wall surface, and the wall surface fixing part protrudes rearward relative to a rearmost end of the protruded portion of the base.

2. The cleaner holder of claim 1, wherein the charging stand body further includes a fixing part coupling boss on the rear surface of the charging stand body, the fixing part coupling boss being configured to be received by the wall surface fixing part.

3. The cleaner holder of claim 2, further comprising a fastener member that is configured to pass through the fixing part coupling boss and the wall surface fixing part based on the fixing part coupling boss being received by the wall surface fixing part.

4. The cleaner holder of claim 3, wherein a front surface of the charging stand body defines an opening configured to receive the fastening member.

5. The cleaner holder of claim 3, wherein the wall surface fixing part comprises:
   a first body configured to contact the charging stand body; and
   a second body coupled to the first body and configured to contact the wall surface, wherein the first body and the second body are configured to receive the fastening member.

6. The cleaner holder of claim 5, wherein the first body surrounds at least a portion of the second body.

7. The cleaner holder of claim 5, wherein the first body includes a guide that is configured to receive the fastening member and to guide the fastening member toward the second body, and wherein the second body includes a guide accommodating part that is configured to receive the guide of the first body and the fastening member that has passed through the guide.

8. The cleaner holder of claim 5, wherein the first body comprises a first fastening boss, and the second body comprises a second fastening boss configured to be inserted into the first fastening boss, wherein the first and second fastening bosses are located within the first body based on the first and second bodies being coupled to each other.

9. The cleaner holder of claim 1, wherein the wall surface fixing part is configured to be fixed to the charging stand body and to the wall surface by an adhesive or a double-sided tape.

10. The cleaner holder of claim 1, further comprising a strap that connects the charging stand body to the wall surface fixing part, the strap being configured, based on the wall surface fixing part being fixed to the wall surface, to limit movement of the charging stand body relative to the wall surface.

11. The cleaner holder of claim 1, further comprising a fixing member located on the rear surface of the charging stand body, the fixing member being configured to slidably couple to the wall surface fixing part.

12. The cleaner holder of claim 1, wherein the base comprises one or more friction parts located at a bottom surface of the base, the one or more friction parts being configured to provide a predetermined friction force between the base and the floor.

13. The cleaner holder of claim 12, wherein the one or more friction parts include a rubber gasket or a spike.

14. The cleaner holder of claim 12, wherein at least some of the one or more friction parts have a shape corresponding to an edge of the bottom surface of the base.

15. The cleaner holder of claim 1, wherein the base comprises one or more suction parts located at a bottom surface of the base, the one or more suction parts being configured to restrict movement of the base by maintaining a negative pressure between the suction parts and the floor.

16. The cleaner holder of claim 1, wherein the base includes:
a first extension extending in a first direction from a first lateral side of a front portion of the base; and
a second extension extending in a second direction opposite the first direction from a second lateral side opposite the first lateral side of the front portion of the base,
wherein the first and second extensions are configured to rest on the floor.

17. The cleaner holder of claim 16, wherein the first and second extensions define a front edge of the base, and
wherein a width of the front edge is greater than a width of a rear edge of the base opposite the front edge.

18. The cleaner holder of claim 16, wherein the support is connected to the base at a location that is rearward of the first and second extensions.

19. The cleaner holder of claim 1, wherein the predetermined distance is greater than a distance between the rearmost end of the protruded portion of the base and the wall surface.

* * * * *